(12) United States Patent
Zhang

(10) Patent No.: US 11,994,394 B2
(45) Date of Patent: May 28, 2024

(54) SYSTEM AND METHOD FOR VALIDATING ROAD OBJECT DATA

(71) Applicant: HERE Global B.V., Eindhoven (NL)

(72) Inventor: Zhenhua Zhang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 593 days.

(21) Appl. No.: 17/200,282

(22) Filed: Mar. 12, 2021

(65) Prior Publication Data
US 2022/0290995 A1    Sep. 15, 2022

(51) Int. Cl.
| | |
|---|---|
| *G01C 21/28* | (2006.01) |
| *G01C 21/00* | (2006.01) |
| *G01C 21/34* | (2006.01) |
| *G01C 21/36* | (2006.01) |
| *G06F 16/23* | (2019.01) |
| *G06Q 10/047* | (2023.01) |
| *G06T 7/00* | (2017.01) |
| *G06T 7/70* | (2017.01) |

(52) U.S. Cl.
CPC ........... *G01C 21/28* (2013.01); *G01C 21/005* (2013.01); *G01C 21/3492* (2013.01); *G01C 21/3691* (2013.01); *G01C 21/3815* (2020.08); *G06F 16/2365* (2019.01); *G06Q 10/047* (2013.01); *G06T 7/70* (2017.01); *G06T 7/97* (2017.01)

(58) Field of Classification Search
None
See application file for complete search history.

(56) References Cited

U.S. PATENT DOCUMENTS

| | | | | |
|---|---|---|---|---|
| 9,459,626 | B2 * | 10/2016 | Chen | G08G 1/0112 |
| 2018/0285664 | A1 * | 10/2018 | Satyakumar | G06N 3/08 |
| 2019/0301873 | A1 * | 10/2019 | Prasser | G01C 21/3848 |
| 2019/0354782 | A1 * | 11/2019 | Kee | G06V 10/763 |
| 2020/0174112 | A1 * | 6/2020 | Xing | G01S 7/417 |
| 2020/0209858 | A1 * | 7/2020 | Trofymov | G06N 3/045 |
| 2020/0240794 | A1 * | 7/2020 | Prasser | G01C 21/3819 |

(Continued)

FOREIGN PATENT DOCUMENTS

DE    102012025067 A1    6/2014

OTHER PUBLICATIONS

Tao Wang, "Context-driven Object Detection and Segmentation with Auxiliary Information," PhD thesis, The Australian National University, Nov. 2016 (Year: 2016).*

(Continued)

*Primary Examiner* — Soo Shin

(57) ABSTRACT

A system for validating the road object data is provided. The system, for example, receives the road object data for a geographic region and determines, from a map database, a state of ground truth data associated with the geographic region. The state of the ground truth data comprises at least one of partial ground truth data and complete ground truth data. Further, the road object data is validated based on the determined state of the ground truth data. The validation of the road object data includes performing a first validation operation when the state of the ground truth data is the partial ground truth data and performing a second validation operation when the state of the ground truth data is the complete ground truth data.

18 Claims, 14 Drawing Sheets

(56) References Cited

U.S. PATENT DOCUMENTS

2021/0150228 A1* 5/2021 Goforth ............ B60W 30/0956
2022/0114764 A1* 4/2022 Beijbom .............. G06V 20/182

OTHER PUBLICATIONS

Ramin, Marjan, "Improvements to Tracking Pedestrians in Video Streams Using a Pre-trained Convolutional Neural Network" 2016). Electronic Thesis and Dissertation Repository. 3886. https://ir.lib.uwo.ca/etd/3886 (Year: 2016).*

* cited by examiner

SYSTEM AND METHOD FOR VALIDATING ROAD OBJECT DATA

TECHNOLOGICAL FIELD

The present disclosure generally relates to routing and navigation systems, and more particularly relates to a method for validating road object data in routing and navigation systems.

BACKGROUND

Currently, various navigation systems are available for vehicle navigation. These navigations systems generally detect road objects posted on a route and output road object data for the detected road objects. Further, the navigations systems may use the outputted road object data for vehicle navigation. However, the road object data outputted by the navigation systems may not be reliable because the navigation systems may fail to accurately detect the road objects in complex road geometries.

BRIEF SUMMARY OF SOME EXAMPLE EMBODIMENTS

In order to solve the foregoing problem, it is an objective of some embodiments to use ground truth data for validating the road object data. According to some embodiments, the ground truth data may be collected using ground truth vehicles. As used herein, the 'ground truth vehicle' may correspond to a vehicle manually driven by human for collecting the ground truth data along a route. The ground truth data may comprise one or more of ground truth driving direction data, ground truth route data, and ground truth information. The ground truth route data may comprise data about a path on which the ground truth vehicle has travelled. The ground truth driving direction data may comprise data about a direction in which the ground truth vehicle has travelled on the path. The ground truth information may comprise ground truth location data (e.g. a location of the ground truth vehicle where a road object was observed) and data about a road object posted on the path, when the road object is applicable to the path. The road object may include at least one of road signs, road obstacles, traffic objects and the like. The road signs may include one or more of a speed limit sign, a route guidance sign, a parking sign, a destination sign, a warning sign, and the like. The road obstacles may include one or more of a road divider, a road work object, and the like. The traffic object may include one or more of a traffic cone, a guide rail, and the like.

Some embodiments are based on the realization that the ground data collected by the ground truth vehicle may be incomplete or partial, due to presence of alternative links to a main link. For instance, the main link may be an expressway, a highway, a freeway, or the like. For instance, the alternative links may be an exit ramp link, an entrance ramp link, a parallel link or the like. In other words, the ground truth vehicles may not cover all alternative links and the main link for collecting the ground truth data, leading to partial ground truth data (also referred to as incomplete ground truth data). In this case, the ground truth data (i.e. the partial ground truth data) cannot be used directly to validate the road object data, because validating the road object data based on the partial ground truth data may lead to false positives or true negatives. Alternatively, the ground truth vehicles may cover all alternative links and the main link for collecting the ground truth data, leading to complete ground truth data. In this case, the ground truth data (i.e. the complete ground truth data) may be used directly to validate the road object data.

To this end, it is objective of some embodiments to determine a state of the ground truth data. In various embodiments, the state of the ground truth data may be determined as at least one of the partial ground truth data or the complete ground truth data. Various embodiments are provided for validating the road object data based on the determined state of the ground truth data. In various embodiments, when the state of the ground truth data is determined as the partial ground truth data, the road object data may be validated by performing a first validation operation. In various embodiments, when the state of the ground truth data is determined as the complete ground truth data, the road object data may be validated by performing a second validation operation. In various embodiments, the road object data may be validated as at least one of correct road object data and incorrect road object. The correct road object data may indicate the road object data is reliable. The incorrect road object data may indicate the road object is not reliable.

In some example embodiments, the correct road object data may be used to provide one or more navigation functions by generating navigation instructions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

A system, a method and a computer programmable product are provided in accordance with an example embodiment described herein for validating the road object data.

In one aspect, a system for validating the road object data is provided. The system comprises a memory configured to store computer-executable instructions; and at least one processor configured to execute the computer-executable instructions to: receive the road object data for a geographic region; determine, from a map database, a state of ground truth data associated with the geographic region, wherein the state of the ground truth data comprises at least one of partial ground truth data and complete ground truth data; and validate the road object data, based on the determined state of the ground truth data, wherein the validation comprises performing a first validation operation when the state of the ground truth data is the partial ground truth data and performing a second validation operation when the state of the ground truth data is the complete ground truth data.

In additional system embodiments, to validate the road object data based on the first validation operation, the at least one processor is further configured to: identify at least one road object observation associated with a road object, wherein the road object data comprises the at least one road object observation; identify location data associated with the road object observation; identify, from the partial ground truth data, at least ground truth route data; and validate the road object data based on the ground truth route data and the location data associated with the at least one road object observation, when the location data is located on a path defined by the ground truth route data.

In additional system embodiments, to validate the road object data based on the first validation operation, the at least one processor is further configured to: identify partial ground truth information from the partial ground truth data, in response to determining that the location data is located on the path defined by the ground truth route data, wherein the partial ground truth information comprises ground truth location data; compare the ground truth location data with the location data associated with the at least one road object observation; and validate the road object data based on the comparison.

In additional system embodiments, to validate the road object data based on the first validation operation, the at least one processor is further configured to: determine a first link from the geographic region, based on the location data associated with the at least one road object observation and map data; determine, based on the road object data, an association between the first link and the road object; and validate the road object data as correct when: the association between the first link and the road object indicates that the road object is placed on the first link, and comparison between the ground truth location data with the location data associated with the at least one road object observation indicates that the ground truth location data is similar to the location data.

In additional system embodiments, to validate the road object data based on the first validation operation, the at least one processor is further configured to: validate the road object data as correct when: the association between the first link and the road object indicates that the road object is not placed on the first link, and comparison between the ground truth location data with the location data associated with the at least one road object observation indicates that the ground truth location data is not similar to the location data.

In additional system embodiments, to validate the road object data based on the first validation operation, the at least one processor is further configured to: identify at least one second link from the geographic region, wherein the at least one second link is connected to the first link; identify, from the road object data, a second association between the at least one second link and the road object; and validate the road object data as correct when: the association between the first link and the road object indicates that the road object is not placed on the first link and the second association between the road object and the second link indicates that the road object is placed on the second link, and comparison between the ground truth location data and the location data associated with the at least one road object observation indicates that the ground truth location data is similar to the location data.

In additional system embodiments, to validate the road object data based on the first validation operation, the at least one processor is further configured to: exclude, from the first validation operation, checking of at least one of the at least one second link and the second association between the at least one second link and the road object, when the at least one second link is not associated with the path defined by the ground truth route data.

In additional system embodiments, to validate the road object data based on the first validation operation, the at least one processor is further configured to: identify driving direction data associated with a road object observation; identify, from the partial ground truth data, ground truth driving direction data; determine whether the driving direction data is overlapping with the ground truth driving direction data; and validate the road object data in response to determining that the driving direction data is overlapping with the ground truth driving direction data.

In additional system embodiments, to validate the road object data based on the second validation operation, the at least one processor is further configured to: identify, from the complete ground truth data, complete ground truth information; compare the road object data with the complete ground truth information; and validate the road object data as at least one of correct road object data and incorrect road object data, based on the comparison.

In additional system embodiments, to determine the state of the ground truth data associated with the geographic region, the at least one processor is further configured to: determine the geographic region, based on map data; identify the ground truth data associated with the geographic region; and extract the state of the ground truth data associated with the geographic region as at least one of the partial ground truth data and the complete ground truth data.

In additional system embodiments, the geographic region comprises at least one of a ramp road geometry, a parallel road geometry, a merging road geometry, and an intersection road geometry. To that end, the geographic region encompasses sensitive locations where any number of links may merge, diverge or run in parallel and the road object may be placed at or near (within a predefined distance range) from these sensitive locations. The partial ground truth data comprises ground truth data for at least one link in the at least one of the ramp road geometry, the parallel road geometry, the merging road geometry, and the intersection road geometry. The complete ground truth data comprises ground truth data for each link in the at least one of the ramp road geometry, the parallel road geometry, the merging road geometry, and the intersection road geometry.

In another aspect, a method for validating the road object data is provided. The method includes: receiving the road object data for a geographic region; determining, from a map database, a state of ground truth data associated with the geographic region, wherein the state of the ground truth data comprises at least one of partial ground truth data and complete ground truth data; and validating the road object data, based on the determined state of the ground truth data, wherein the validation comprises performing a first validation operation when the state of the ground truth data is the partial ground truth data and performing a second validation operation when the state of the ground truth data is the complete ground truth data.

In additional method embodiments, validating the road object data based on the first validation operation comprises: identifying at least one road object observation associated with a road object, wherein the road object data comprises the at least one road object observation; identifying location data associated with the road object observation; identifying, from the partial ground truth data, at least ground truth route data; and validating the road object data based on the ground truth route data and the location data associated with the at least one road object observation, when the location data is located on a path defined by the ground truth route data.

In additional method embodiments, validating the road object data based on the first validation operation further comprises: identifying partial ground truth information from the partial ground truth data, in response to determining that the location data is located on the path defined by the ground truth route data, wherein the partial ground truth information comprises ground truth location data; comparing the ground truth location data with the location data associated with the at least one road object observation; and validating the road object data based on the comparison.

In additional method embodiments, validating the road object data based on the first validation operation further comprises: determining a first link from the geographic region based on the location data associated with the at least one road object observation and map data; determining, based on the road object data, an association between the first link and the road object; and validating the road object data as correct when: the association between the first link and the road object indicates that the road object is placed on the first link, and comparison between the ground truth location data with the location data associated with the at least one road object observation indicates that the ground truth location data is similar to the location data.

In additional method embodiments, validating the road object data based on the first validation operation further comprises: validating the road object data as correct when: the association between the first link and the road object indicates that the road object is not placed on the first link, and comparison between the ground truth location data with the location data associated with the at least one road object observation indicates that the ground truth location data is not similar to the location data.

In additional method embodiments, validating the road object data based on the first validation operation further comprises: identifying at least one second link from the geographic region, wherein the at least one second link is connected to the first link; identifying, from the road object data, a second association between the at least one second link and the road object; and validating the road object data as correct when: the association between the first link and the road object indicates that the road object is not placed on the first link and the second association between the road object and the second link indicates that the road object is placed on the second link, and comparison between the ground truth location data and the location data associated with the at least one road object observation indicates that the ground truth location data is similar to the location data.

In additional method embodiments, validating the road object data based on the first validation operation further comprises excluding, from the first validation operation, at least one of the at least one second link and the second association between the at least one second link and the road object, when the at least one second link is not associated with the path defined by the ground truth route data.

In additional method embodiments, validating the road object data based on the second validation operation comprises: identifying, from the complete ground truth data, complete ground truth information; comparing the road object data with the complete ground truth information; and validating the road object data as at least one of valid road object data and invalid road object data, based on the comparison.

In yet another aspect, a computer program product comprising a non-transitory computer readable medium having stored thereon computer executable instruction which when executed by at least one processor, cause the processor to carry out operations for validating road object data, the operations comprising: receiving the road object data for a geographic region; determining, from a map database, a state of ground truth data associated with the geographic region, wherein the state of the ground truth data comprises at least one of partial ground truth data and complete ground truth data; and validating the road object data, based on the determined state of the ground truth data, wherein the validation comprises performing a first validation operation when the state of the ground truth data is the partial ground truth data and performing a second validation operation when the state of the ground truth data is the complete ground truth data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
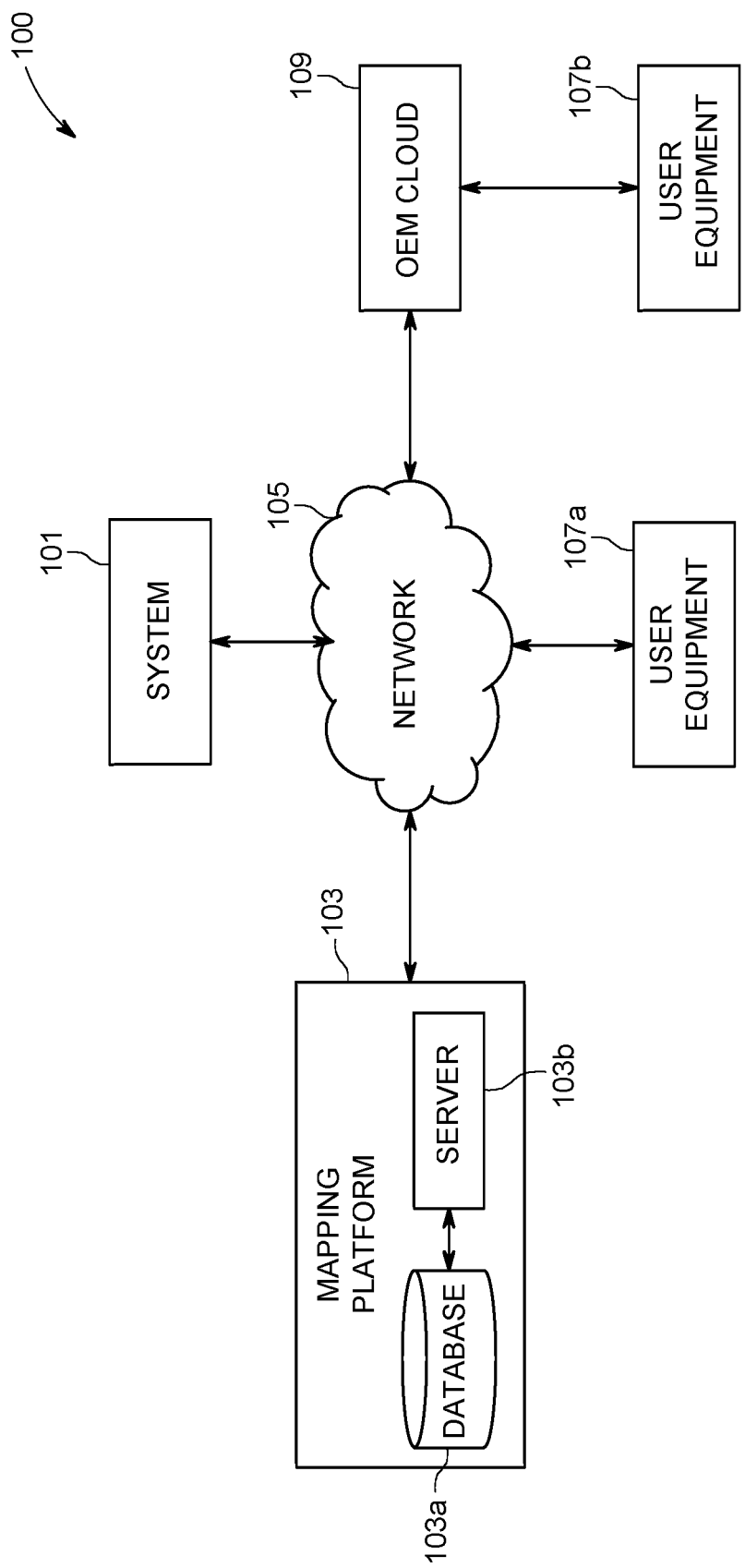
Figure 2:
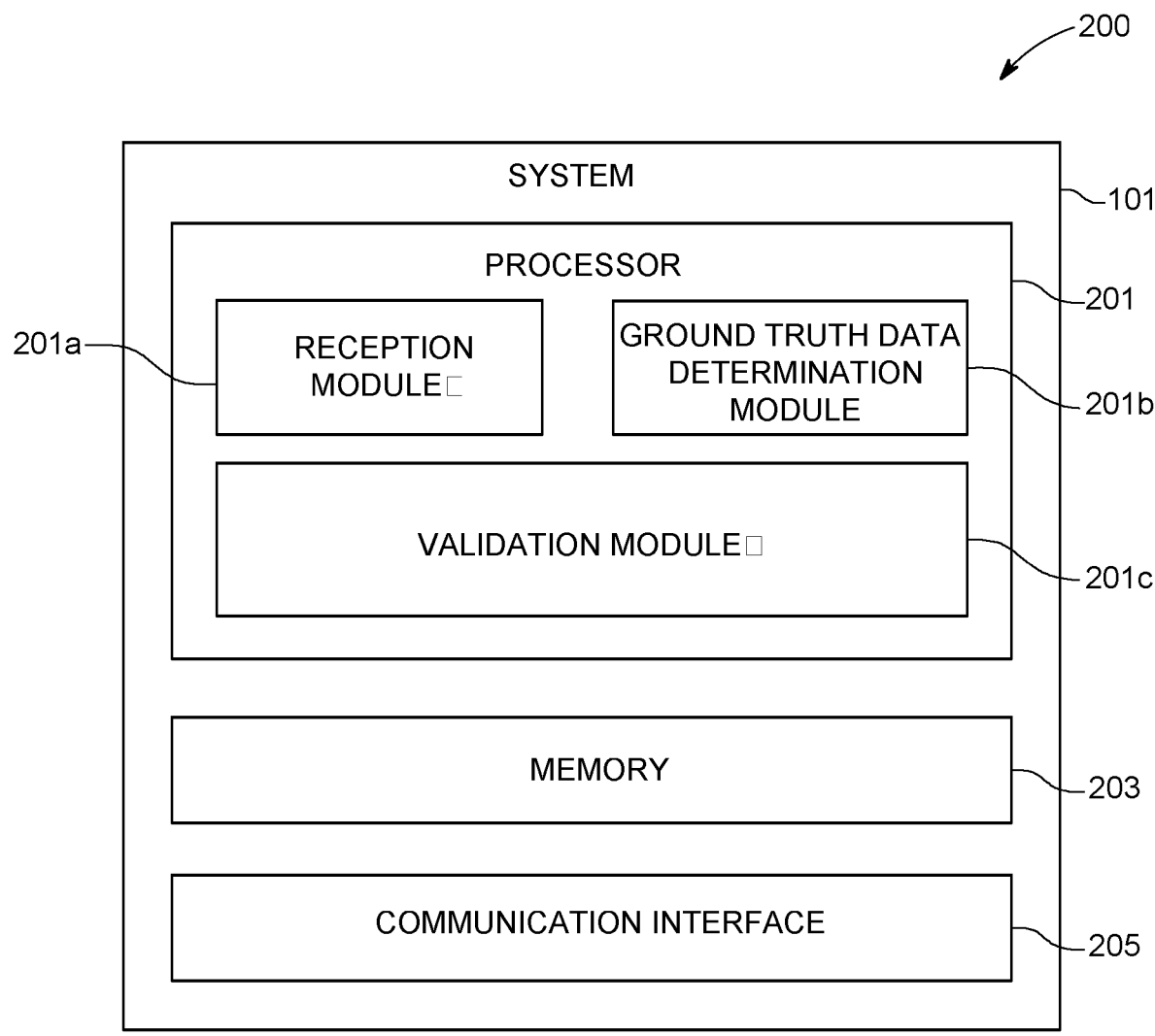
Figure 3A:
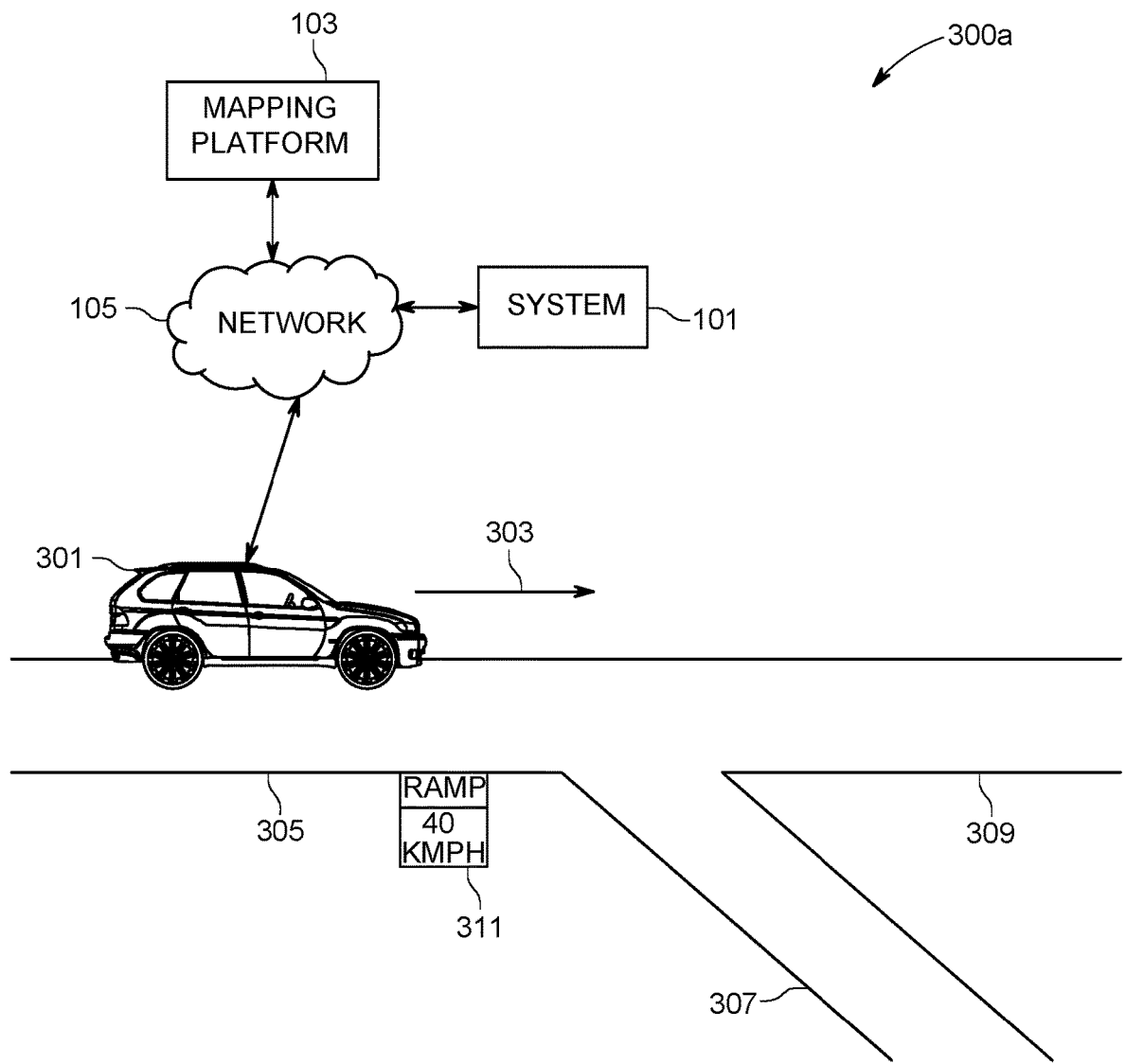
Figure 3B:
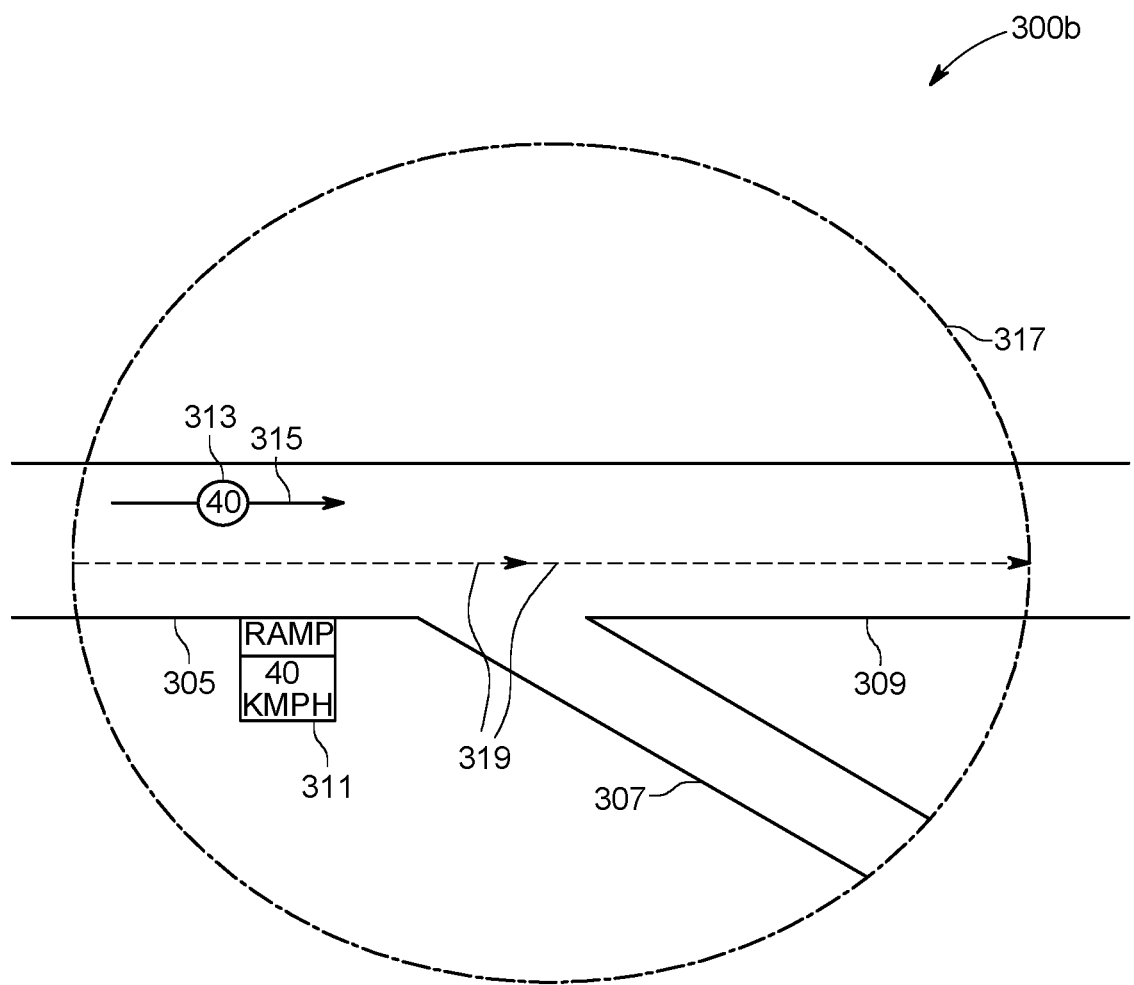
Figure 3C:
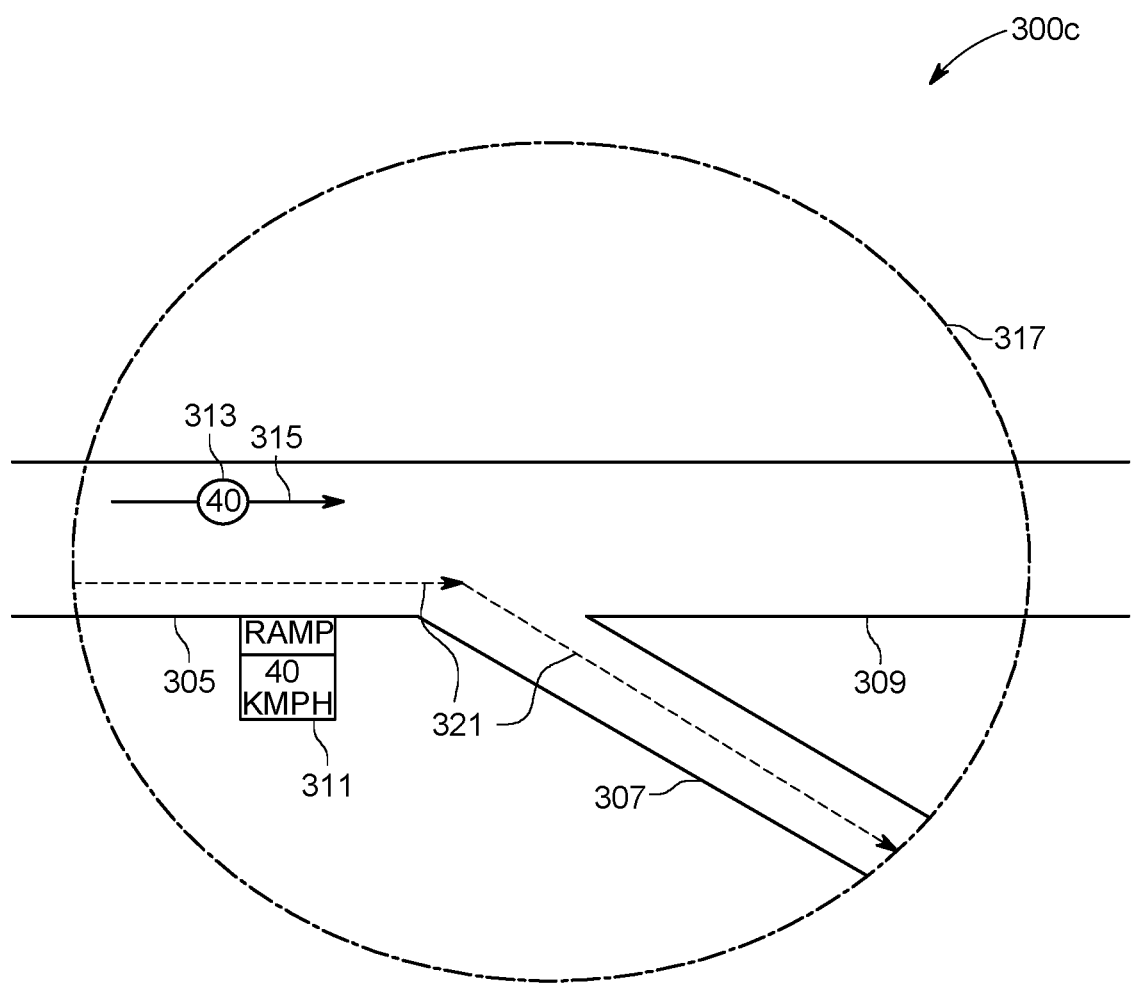
Figure 3D:
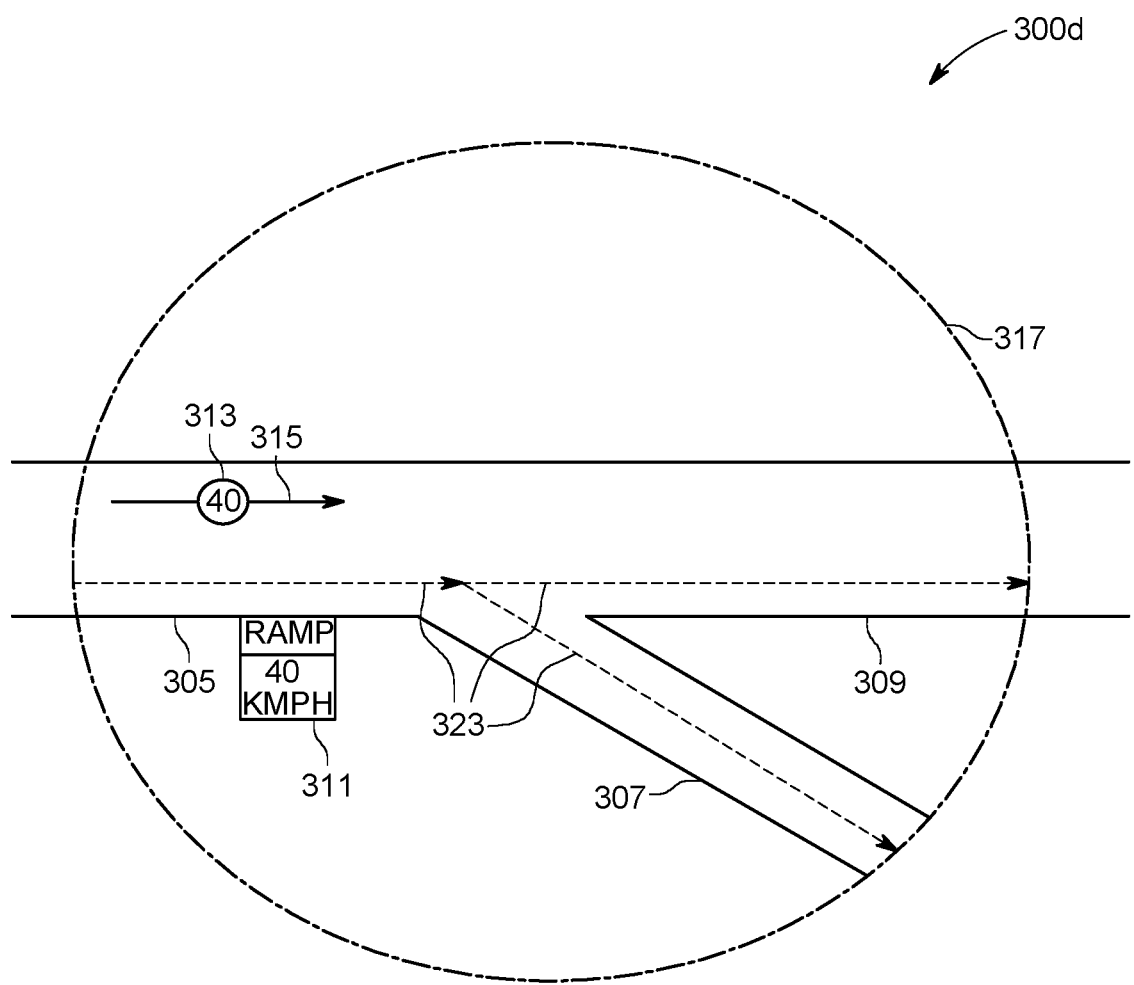
Figure 3E:
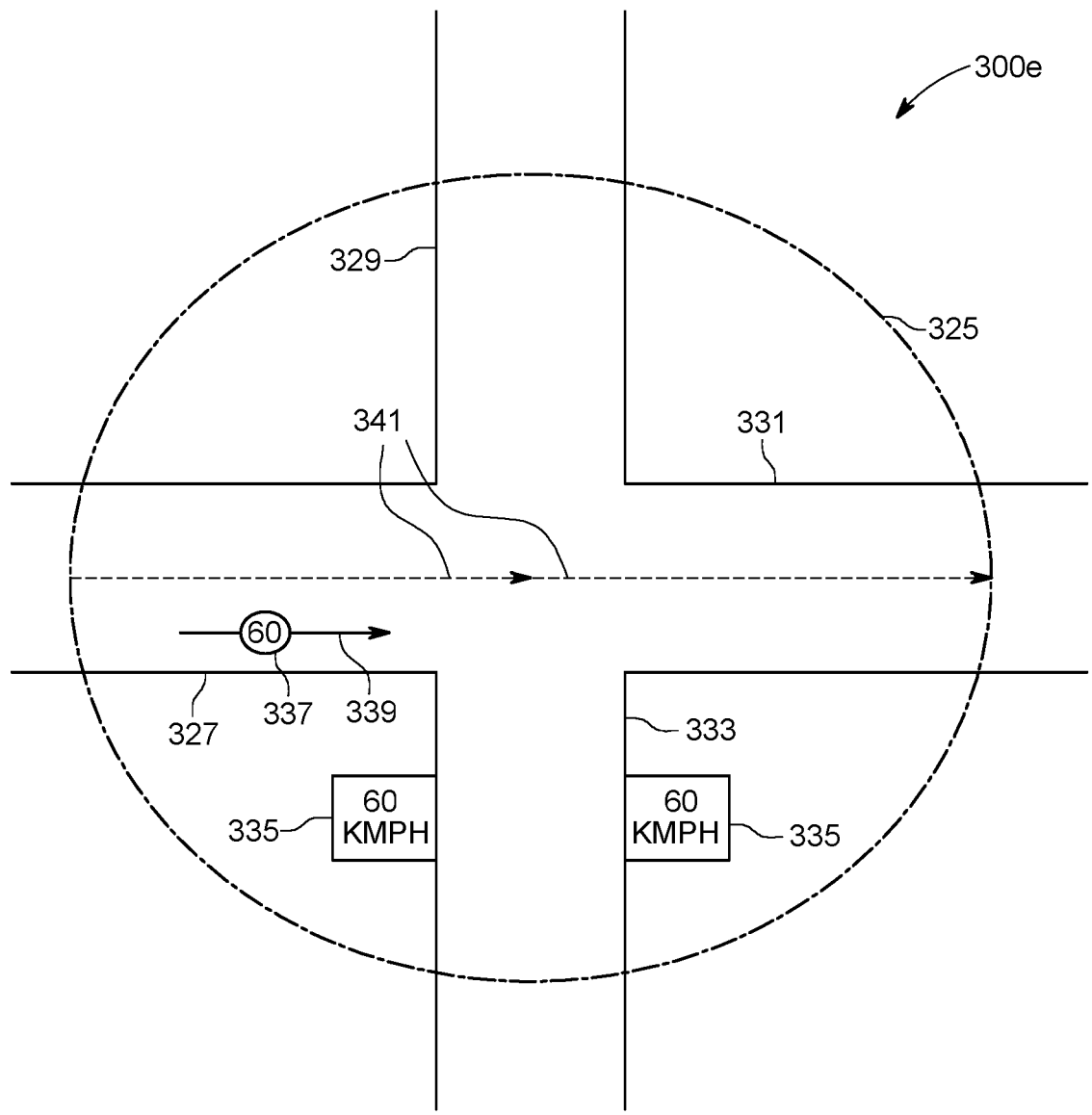
Figure 3F:
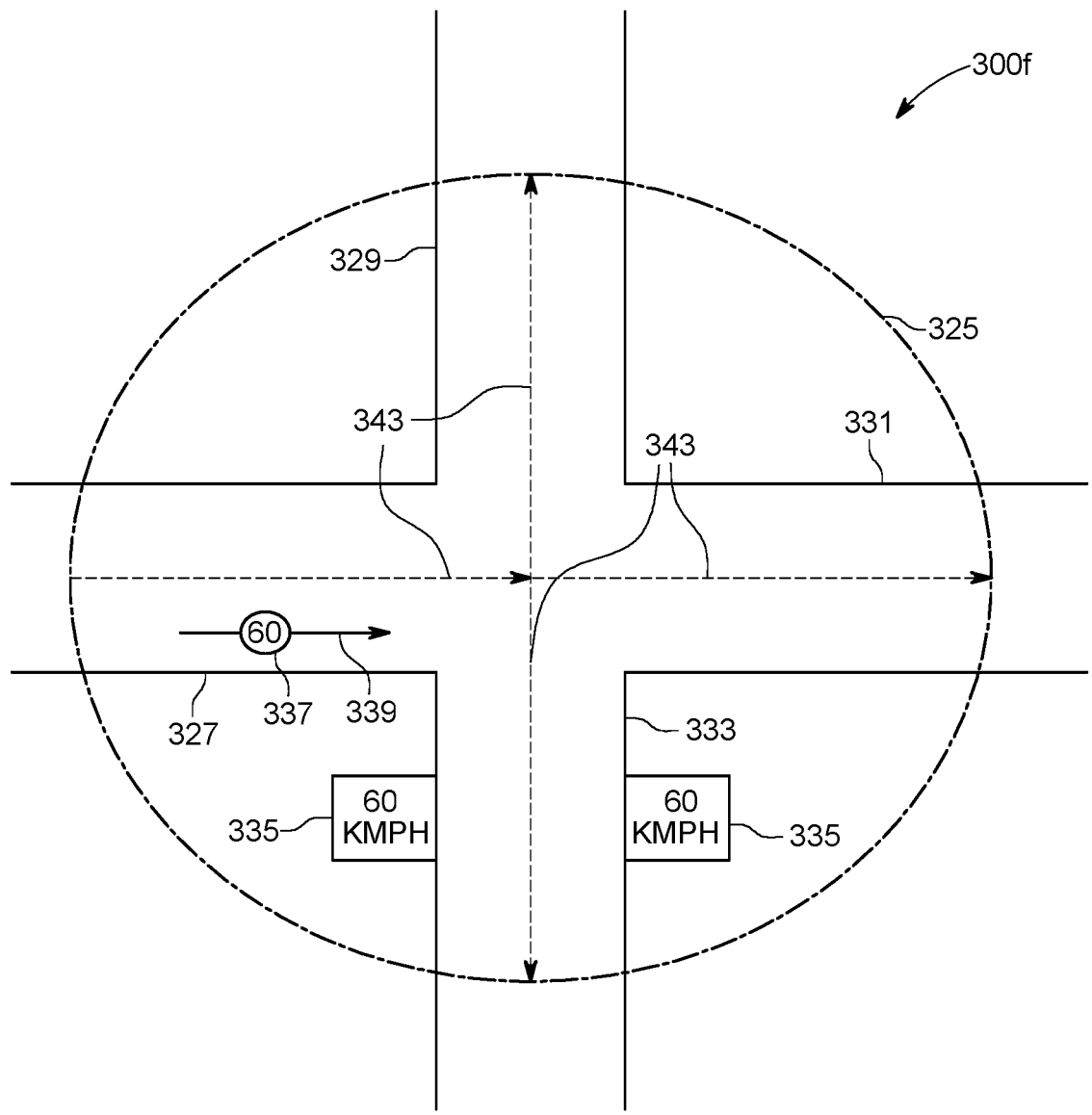
Figure 3G:
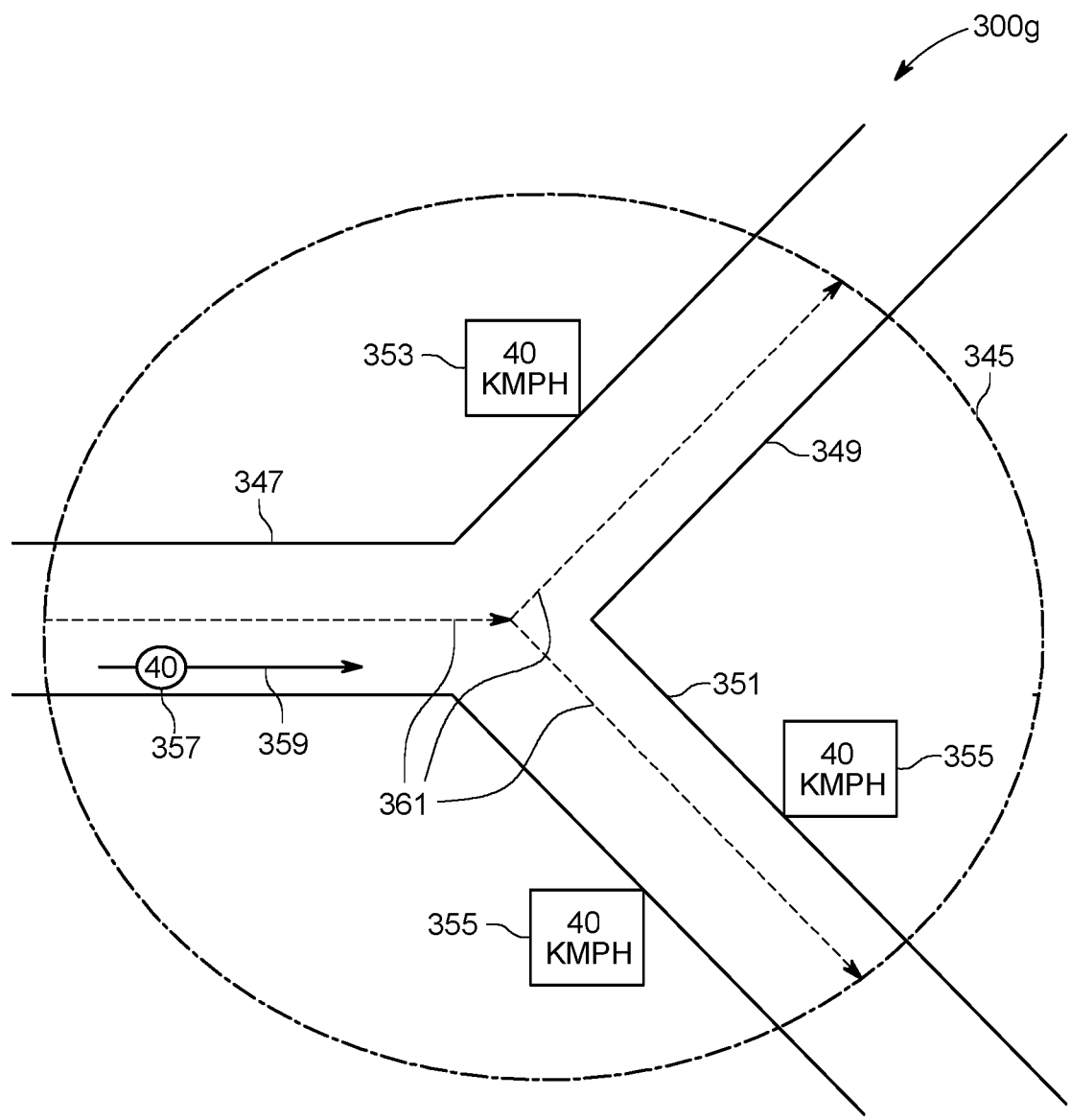
Figure 3H:
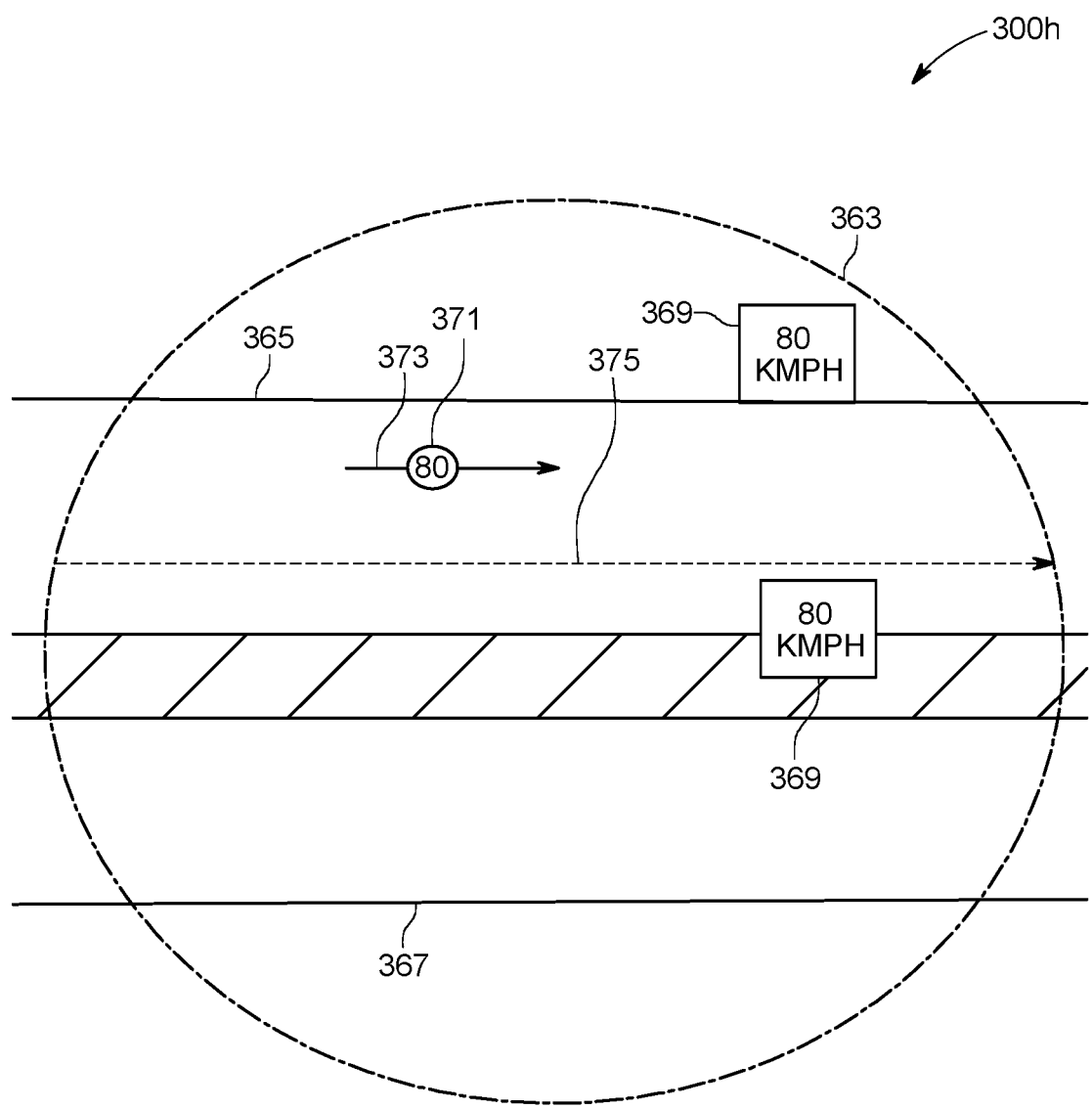
Figure 3I:
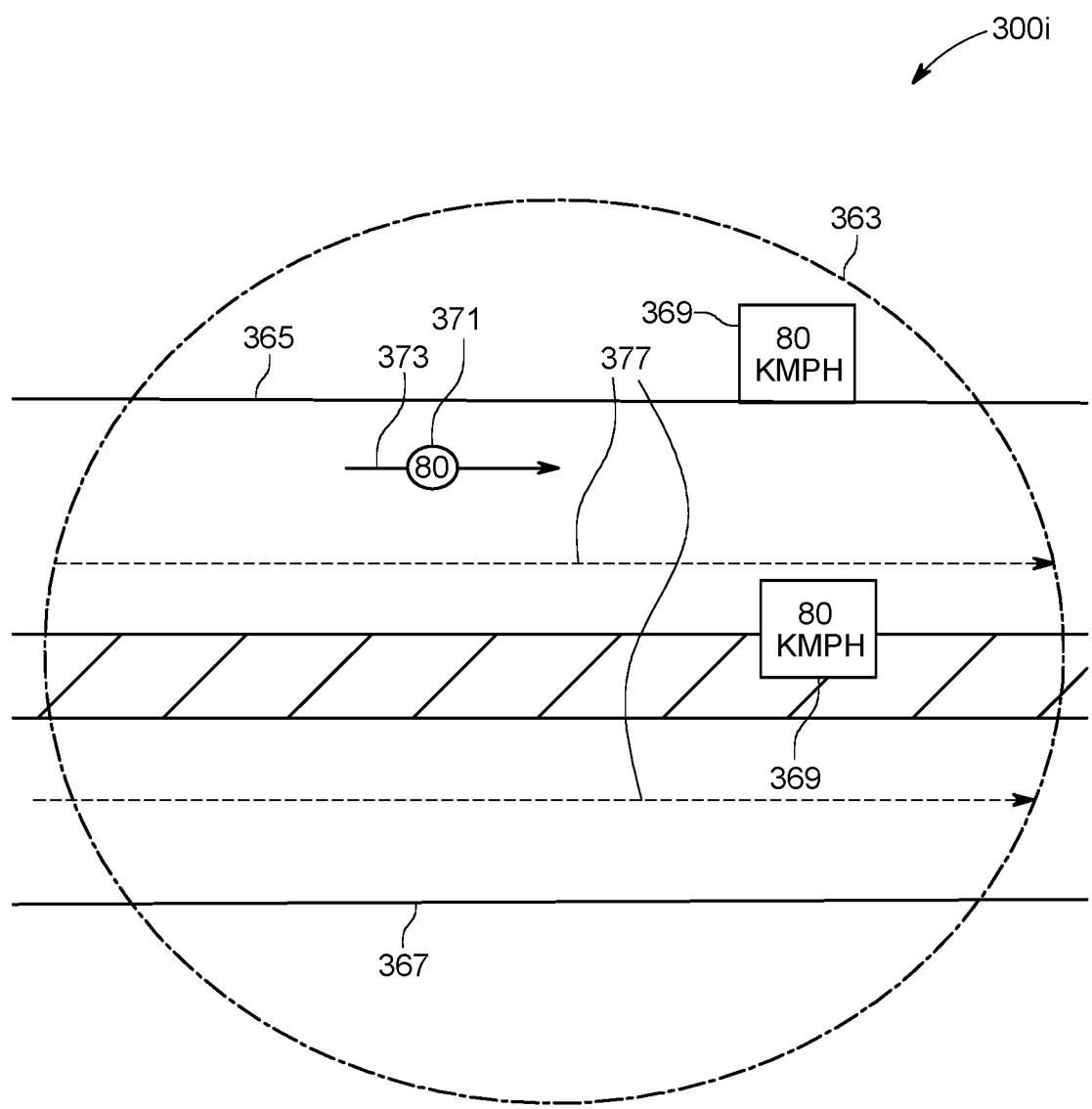
Figure 4A:
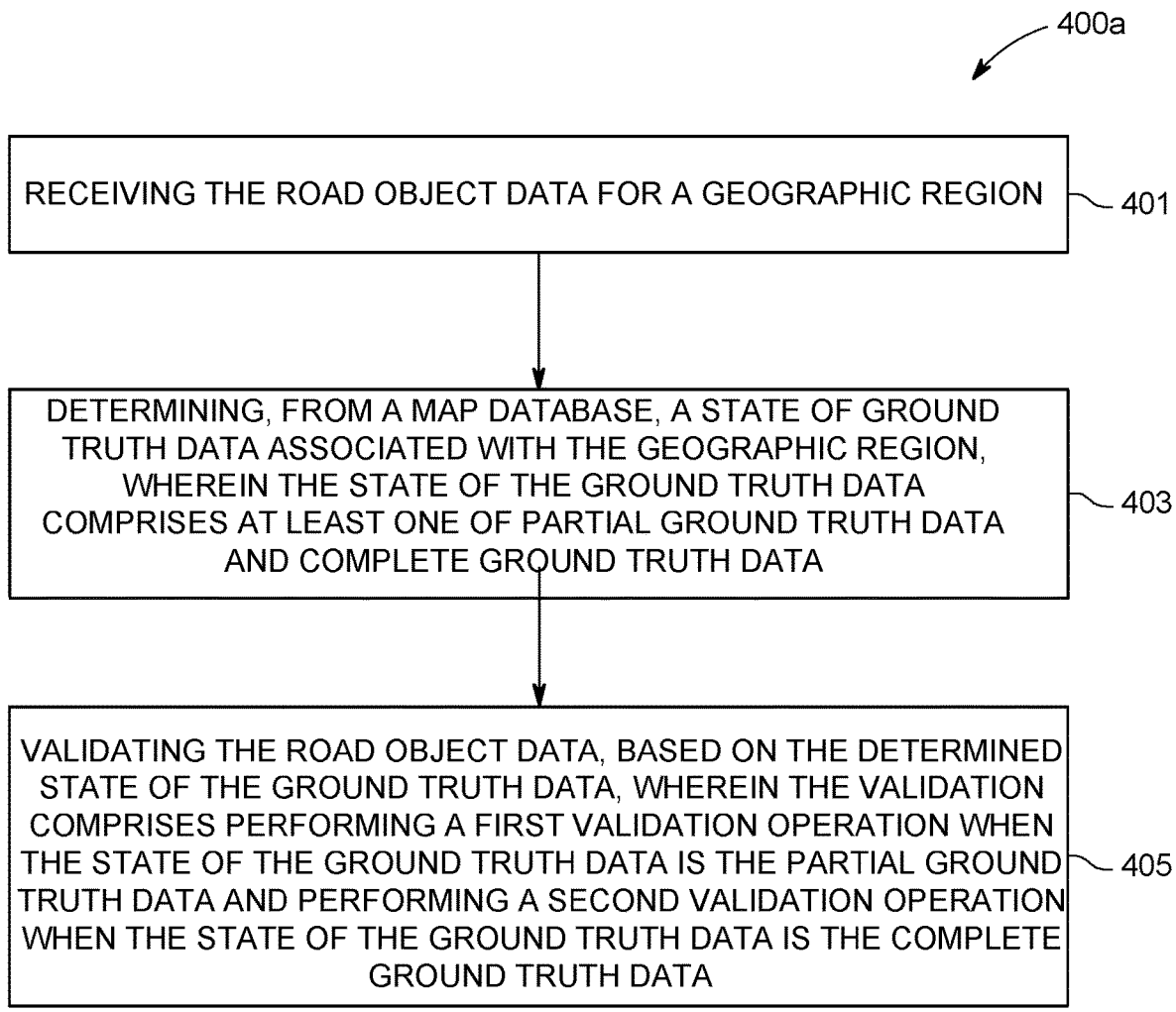
Figure 4B:
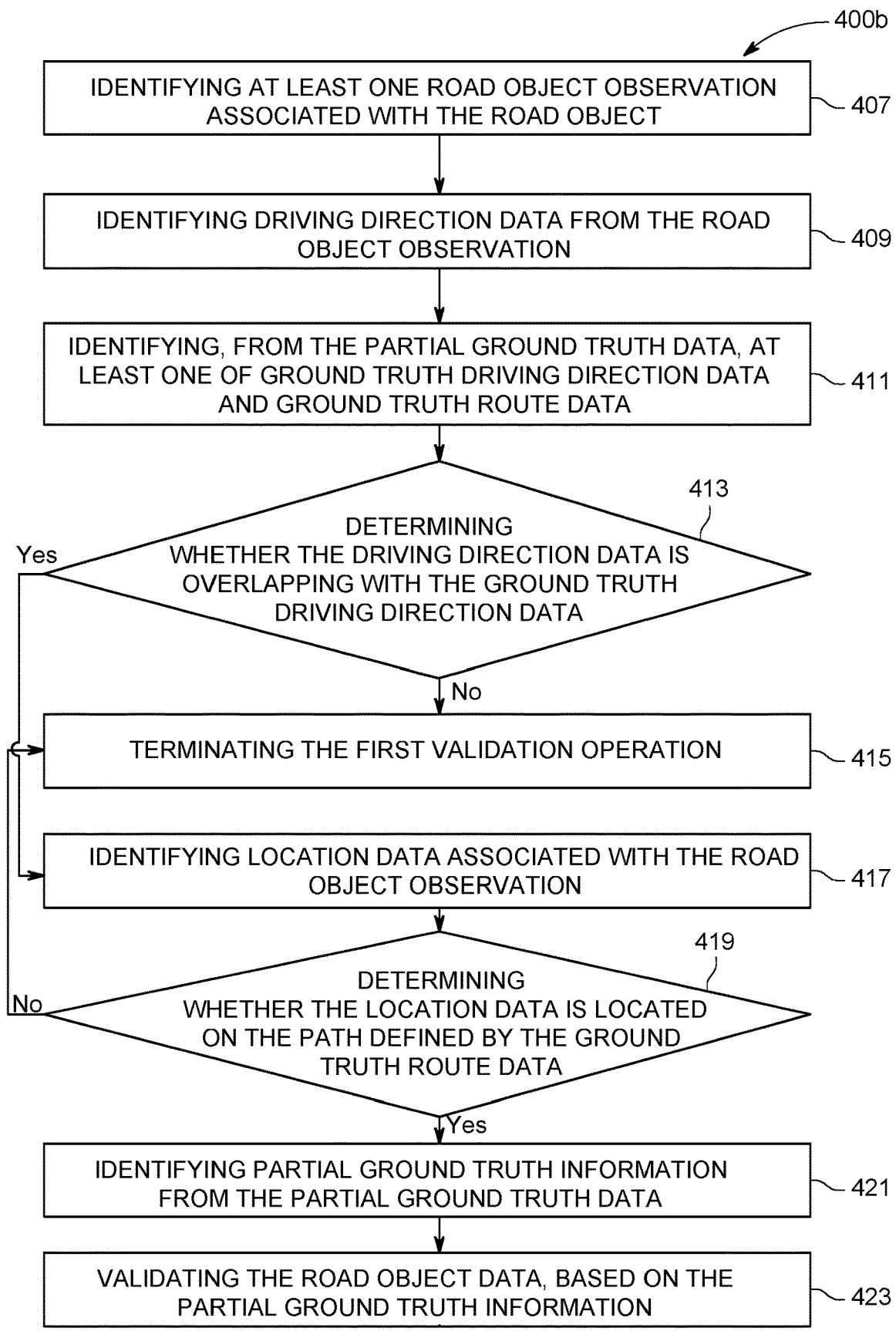
Figure 4C:
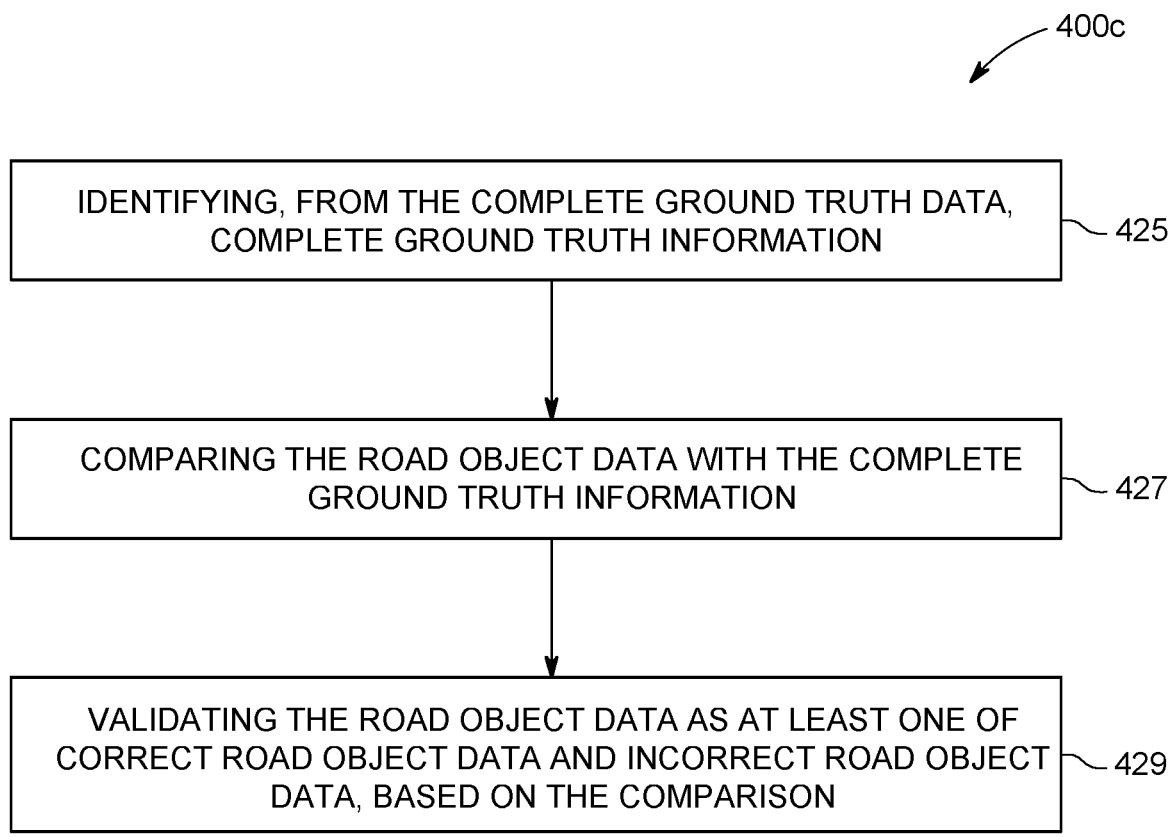

Having thus described example embodiments of the invention in general terms, reference will now be made to the accompanying drawings, which are not necessarily drawn to scale, and wherein:

FIG. 1 illustrates a block diagram showing a network environment of a system for validating road object data, in accordance with one or more example embodiments;

FIG. 2 illustrates a block diagram of the system for validating the road object data, in accordance with one or more example embodiments;

FIG. 3A illustrates an exemplary working environment of the system for validating the road object data, in accordance with one or more example embodiments;

FIG. 3B illustrates a first working environment of the system for validating the road object data, in accordance with one or more example embodiments;

FIG. 3C illustrates a second working environment of the system for validating the road object data, in accordance with one or more example embodiments;

FIG. 3D illustrates a third working environment of the system for validating the road object data, in accordance with one or more example embodiments;

FIG. 3E illustrates a fourth working environment of the system for validating the road object data, in accordance with one or more example embodiments;

FIG. 3F illustrates a fifth working environment of the system for validating the road object data, in accordance with one or more example embodiments;

FIG. 3G illustrates a sixth working environment of the system for validating the road object data, in accordance with one or more example embodiments;

FIG. 3H illustrates a seventh working environment of the system for validating the road object data, in accordance with one or more example embodiments;

FIG. 3I illustrates an eighth working environment of the system for validating the road object data, in accordance with one or more example embodiments;

FIG. 4A illustrates a flowchart depicting a method for validating the road object data, in accordance with one or more example embodiments;

FIG. 4B illustrates a flowchart depicting a method for validating the road object data based on a first validation operation, in accordance with one or more example embodiments; and FIG. 4C illustrates a flowchart depicting a method for validating the road object data based on a second validation operation, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for validating a road object data. Various embodiments are provided for receiving road object data for a geographic region. In various embodiments, the geographic region may comprise at least one of a ramp road geometry, a parallel road geometry, a merging road geometry, and an intersection road geometry. In various embodiments, the road object data may be an output received from a road object model and/or an algorithm related to road object detection. In various embodiments, the road object data may be sensor based data detected by one or more vehicles equipped with one or more sensors for road object detection for the road object model. Various embodiments are provided for determining, from a map database, a state of ground truth data associated with the geographic region. In various embodiments, the state of the ground truth data may be determined as at least one of partial ground truth data and complete ground truth data. Various embodiments are provided for validating the road object data based on the determined state of the ground truth data. In some embodiments, when the state of the ground truth data is determined as the partial ground truth data, the road object data may be validated by performing a first validation operation. In some other embodiments, when the state of the ground truth data is determined as the complete ground truth data, the road object data may be validated by performing a second validation operation.

In various embodiments, the road object data may be validated as at least one of correct road object data or incorrect road object road object, based on the outcome of at least one of the first validation operation and the second validation operation. The correct road object data may be indicative of reliable road object data. The incorrect road object data may be indicative of non-reliable road object data. Various embodiments are provided for providing one or more navigation functions using the correct road object data. Some non-limiting examples of the navigation functions includes providing vehicle speed guidance, vehicle speed handling and/or control, providing a route for navigation (e.g., via a user interface), localization service, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and the like.

FIG. 1 illustrates a block diagram 100 showing a network environment of a system 101 for validating road object data, in accordance with one or more example embodiments. The system 101 may be communicatively coupled, via a network 105, to one or more of a mapping platform 103, a user equipment 107a, and/or an OEM (Original Equipment Manufacturer) cloud 109. The OEM cloud 109 may be further connected to a user equipment 107b. The components described in the block diagram 100 may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud based service, a cloud based application, a cloud based platform, a remote server based service, a remote server based application, a remote server based platform, or a virtual computing system. As such, the system 101 may be configured to operate inside the mapping platform and/or inside at least one of the user equipment 107a and the user equipment 107b.

In some embodiments, the system 101 may be embodied within one or both of the user equipment 107a and the user equipment 107b, for example as a part of an in-vehicle navigation system, a navigation app in a mobile device and the like. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to validate the road object data.

In some other embodiments, the system 101 may be a server 103b of the mapping platform 103 and therefore may be co-located with or within the mapping platform 103. In yet some other embodiments, the system 101 may be implemented within an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103. Further, in some example embodiments, the system 101 may be a standalone unit configured to validate the road object data for the autonomous vehicle. Additionally, the system 101 may be coupled with an external device such as the autonomous vehicle.

The mapping platform 103 may comprise a map database 103a (also referred to as geographic database 103a) for storing map data and a processing server 103b for carrying out the processing functions associated with the mapping platform 103. The map database 103a may store node data, road segment data or link data, point of interest (POI) data, road obstacles related data, traffic objects related data, posted signs related data, such as road sign data, or the like. The map database 103a may also include cartographic data and/or routing data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities.

Optionally, the map database 103a may contain path segment and node data records, or other data that may represent pedestrian paths or areas in addition to or instead of the vehicle road record data, for example. The road/link segments and nodes may be associated with attributes, such as geographic coordinates, ground truth data records and other navigation related attributes, as well as POIs, such as fueling stations, hotels, restaurants, museums, stadiums, offices, auto repair shops, buildings, stores, parks, etc. Additionally, the road/link segments and nodes may be associated with attributes, such as lane data records. The lane data records may comprise data related to a number of lanes on a particular link/road segment. Additionally, the lane data records may comprise legal travel directions (travel directions that the vehicles should follow while traveling on lanes of a particular link/road segment), lane level maneuver pattern, and the like.

The ground truth data records may comprises ground truth data that include one or more of ground truth driving direction data, ground truth route data, and ground truth information. According to some embodiments, the ground truth data of the ground truth data records may be collected by ground truth vehicles that were manually driven by human drivers. In an embodiment, the ground truth data of the ground truth data records may be manually collected by one or more humans in the ground truth vehicles. In an alternate embodiment, the ground truth data of the ground truth data records may be collected by a ground truth recorder device installed in the ground truth vehicle. As used herein, the 'ground truth vehicle' may correspond to a vehicle manually driven by human for collecting the ground truth data. As used herein, the ground truth recorder device may be a device (comprising memory and processor) to record a ground truth vehicle location (also referred to as ground truth location data) and data about a road object, when the road object is observed and the road object is applicable on a link in which the ground truth vehicle is currently travelling.

The ground truth route data may comprise data about a path travelled by the ground truth vehicle. For instance, the ground truth route data may comprise data about links and/or lanes in the links on which the ground truth vehicle has travelled. The ground truth driving direction data may comprise data about a direction in which the ground truth vehicle has travelled on a particular link. The ground truth information may comprise the ground truth location data and the data about the road object posted on the link on which the ground truth vehicle has travelled. The road object may include at least one of road signs, road obstacles, traffic objects and the like. The road signs may include one or more of a speed limit sign, a route guidance sign, a parking sign, a destination sign, a warning sign, and the like. The road obstacles may include one or more of a road divider, a road work object, and the like. The traffic object may include one or more of a traffic cone, a guide rail, and the like.

According to some other embodiments, the ground truth data may be collected from other sources, such as municipalities or respective geographic authorities. In yet other embodiments, the ground truth data may be collected using remote sensing, such as aerial or satellite photography. The map database 103a may also include data about the POIs and their respective locations in the POI records. The map database 103a may additionally include data about places, such as cities, towns, or other communities, and other geographic features such as bodies of water, mountain ranges, etc. Such place or feature data may be part of the POI data or may be associated with POIs or POI data records (such as a data point used for displaying a city). In addition, the map database 103a may include event data (e.g., traffic incidents, construction activities, scheduled events, unscheduled events, etc.) associated with the POI data records or other records of the map database 103a.

According to some embodiments, the map data in the map database 103a may be stored as a digital map. The digital map may correspond to satellite raster imagery, bitmap imagery, or the like. The satellite rater imagery/bitmap imagery may include map features (such as road/link segments, nodes, and the like) and attributes associated with the map features. In some embodiments, the map features may have a vector representation form. Additionally, the satellite raster imagery may include three dimensional (3D) map data that corresponds to 3D map features, which are defined as vectors, voxels, or the like. In these embodiments, the digital map may be divided into map tiles. Each map tile of the digital map may define a geographic region. The geographic region may include one or more link segments, one or more nodes associated with the one or more link segments, and the attributes associated with the one or more link segments. For example, the geographic region may include a ramp road geometry having a main link segment, a ramp link segment, a ramp start location, and attributes associated with the main link segment and the ramp link segment. The main link segment may correspond to freeway, motorway, expressway, highway, and the like. The ramp link segment may correspond to at least one of an exit-ramp or entrance ramp link associated with the main link segment.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, the map data may be compiled (such as into a platform specification format (PSF) format) to organize and/or configure the data for performing navigation-related functions and/or services, such as route calculation, route guidance, map display, speed calculation, distance and travel time functions, navigation instruction generation and other functions, by a navigation device, such as by the user equipment 107a and/or 107b. The navigation-related functions may correspond to vehicle navigation, pedestrian navigation, navigation instruction suppression, navigation instruction generation based on user preference data or other types of navigation. The compilation to produce the end user databases may be performed by a party or entity separate from a map developer. For example, a customer of the map developer, such as a navigation device developer or other end user device developer, a navigation app service provider and the like may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 107a and/or the user equipment 107b to provide navigation and/or map-related functions. For example, the map database 103a may be used with the user equipment 107a and/or the user equipment 107b to provide an end user with navigation features. In such a case, the map database 103a may be downloaded or stored locally (cached) on the user equipment 107a and/or the user equipment 107b.

The processing server 103b may comprise processing means, and communication means. For example, the processing means may comprise one or more processors configured to process requests received from the user equipment 107a and/or the user equipment 107b. The processing means may fetch map data from the map database 103a and transmit the same to the user equipment 107b via the OEM cloud 109 in a format suitable for use by the one or both of the user equipment 107a and/or the user equipment 107b. In one or more example embodiments, the mapping platform 103 may periodically communicate with the user equipment 107a and/or the user equipment 107b via the processing server 103b to update a local cache of the map data stored on the user equipment 107a and/or the user equipment 107b. Accordingly, in some example embodiments, the map data may also be stored on the user equipment 107a and/or the user equipment 107b and may be updated based on periodic communication with the mapping platform 103 via the network 105.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In some example embodiments, the user equipment 107a and the user equipment 107b may be any user accessible device such as a mobile phone, a smartphone, a portable computer, and the like that are portable in themselves or as a part of another portable/mobile object such as a vehicle. The user equipment 107a and 107b may comprise a processor, a memory, and a communication interface. The processor, the memory, and the communication interface may be communicatively coupled to each other. In some example embodiments, the user equipment 107a and 107b may be associated, coupled, or otherwise integrated with a vehicle, such as an advanced driver assistance system (ADAS), a personal navigation device (PND), a portable navigation device, an infotainment system and/or other device that may be configured to provide route guidance and navigation related functions to the user. In such example embodiments, the user equipment 107a and 107b may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 107a and 107b. For example, the user equipment 107a and 107b may be configured to execute and run mobile applications such as a messaging application, a browser application, a navigation application, and the like.

In one embodiment, at least one user equipment such as the user equipment 107a may be directly coupled to the system 101 via the network 105. For example, the user equipment 107a may be the ground truth vehicle (or a part thereof) for gathering the ground truth data of the map data stored in the map database 103a. In another embodiment, at least one user equipment such as the user equipment 107b may be coupled to the system 101 via the OEM cloud 109 and the network 105. For example, the user equipment 107b may be a consumer vehicle (or a part thereof) and may be a beneficiary of the services provided by the system 101. In some example embodiments, one or more of the user equipment 107a and 107b may serve the dual purpose of a data gatherer and a beneficiary device. At least one of the user equipment 107a and 107b may be configured to capture the road object posted on the link/road segment as a road object observation, while traversing. For example, the road object observation may include image data of the road object and location data, among other things. As disclosed in conjunction with various embodiments disclosed herein, the system 101 may validate road object data, based on the road object observation.

FIG. 2 illustrates a block diagram 200 of the system 101 for validating the road object data, in accordance with one or more example embodiment. The system 101 may include a processing means such as at least one processor 201, storage means such as a memory 203, and a communication means such as a communication interface 205. Further, the system 101 may comprise a reception module 201a, a ground truth data determination module 201b, and a validation module 201c. In various embodiments, the reception module 201a is configured to receive the road object data for a geographic region. In various embodiments, the ground truth data determination module 201b is configured to determine, from the map database 103a, a state of the ground truth data associated with the geographic region. The state of the ground truth data may be determined as at least one of partial ground truth data and complete ground truth data. In various embodiments, the validation module 201c is configured to validate the road object data based on the state of the ground truth data determined by the ground truth data determination module 201b. When the state of the ground truth data is determined as the partial ground truth data, the validation module 201c may validate the road object data by performing a first validation operation. When the state of the ground truth data is determined as the complete ground truth data, the validation module 201c may validate the road object data by performing a second validation operation.

According to some embodiments, each of the modules 201a-201c may be embodied in the processor 201. The processor 201 may retrieve computer program code instructions that may be stored in the memory 203 for execution of the computer program code instructions, which may be configured for validating the road object data.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with a memory 203 via a bus for passing information to mapping platform 103. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the system 101 to carry out various functions in accordance with an example embodiment of the present disclosure. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present disclosure while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to a user of the system 101, where the user may be a traveler, a driver of the vehicle and the like. In some embodiments, the user may be or correspond to an autonomous or semi-autonomous vehicle. The IoT related capabilities may in turn be used to provide smart navigation solutions by providing real time updates to the user to take pro-active decision on speed determination, lane-level speed determination, turn-maneuvers, lane changes, overtaking, merging and the like, big data analysis, and sensor-based data collection by using the cloud based mapping system for providing navigation recommendation services to the user. The system 101 may be accessed using the communication interface 205. The communication interface 205 may provide an interface for accessing various features and data stored in the system 101. For example, the communication interface 205 may comprise I/O interface which may be in the form of a GUI, a touch interface, a voice enabled interface, a keypad and the like. For example, the communication interface 205 may be a touch enabled interface of a navigation device installed in a vehicle, which may also display various navigation related data to the user of the vehicle. Such navigation related data may include information about upcoming conditions on a route, route display, alerts about vehicle speed, user assistance while wrong way driving, and the like.

FIG. 3A illustrates an exemplary working environment 300a of the system 101 for validating the road object data, in accordance with one or more example embodiments. As illustrated in FIG. 3A, the working environment 300a includes the system 101, the mapping platform 103, the network 105, a vehicle 301, a driving direction 303 associated with the vehicle 301, a link 305, a link 307, a link 309, and a road object 311. As used herein, the 'driving direction' 303 may be indicative of a direction in which the vehicle 301 is traveling. The direction may be an angle measured relative to a north direction, a line-of-sight direction, or the like. As used herein, the 'link' (e.g. the link 305, the link 307, the link 309) may be a road segment between two nodes (each node may represent an intersection). The link 305 may be a freeway, an expressway, a highway, and the like. The link 309 may also be the freeway, the expressway, the highway, and the like propagated from the link 305. The link 307 may be an exit-ramp link connected to the link 305. The link 307 allows the vehicle 301 to exit the freeway, the expressway, the highway, and the like. Alternatively, the link 307 may be an entrance ramp link (also referred to as a merging link) that allows one or more vehicles to enter the freeway, the expressway, the highway, and the like.

The vehicle 301 may include a motor vehicle, a non-motor vehicle, an automobile, a car, a scooter, a truck, a van, a bus, a motorcycle, a bicycle, a Segway, and/or the like. The vehicle 301 may be an autonomous vehicle, a semi-autonomous vehicle, or a manual vehicle. As used herein, the autonomous vehicle may be a vehicle that is capable of sensing its environment and operating without human involvement. For instance, the autonomous vehicle may be a self-driving car and the like. In various embodiments, the vehicle 301 may include various sensors for sensing its surrounding environment. For instance, the sensors of the vehicle 301 may include a radar system, a LiDAR system, a global positioning sensor for gathering location data (e.g., GPS), image sensors, temporal information sensors, orientation sensors augmented with height sensors, tilt sensors, and the like.

In various embodiments, the vehicle 301 (e.g. the sensors of the vehicle 301) may collect one or more road object observations associated with one or more road objects for the link 305, when the vehicle 301 is traveling on the link 305. Indeed, the sensors of the vehicle 301 may collect the road object observations associated with the road objects located within a threshold distance from a location of the vehicle 301. As a result, the sensors may wrongly collect the road object observations for the road objects that are associated with the link 307, while traveling on link 305. For instance, the sensors of the vehicle 301 may wrongly collect the road object observations associated with the road object 311 (that is associated with the link 307), while traveling on link 305.

To this end, a road object model may be provided to determine whether the road object observation for the road object 311 should be associated with the link 305 or the link 307. As used herein, the road object model may be a set of instructions (e.g. an algorithm) that configure a device (comprising a processor and a memory) to associate the road object observation of the road object 311 to at least one of the link 305 or the link 307. In one embodiment, the device that executes the road object model may be co-located within the system 101. In another embodiment, the device that executes the road object model may be located outside the system 101, but within the vehicle 301. In yet another embodiment, the device that executes the road object model may be obtained from third parties. Indeed, the road object model may use a point-based approach to associate the road object observation of the road object 311 to at least one of the link 305 or the link 307. For example, the road object model may use a location of the road object 311 and road object information in the road object observation to associate the road object observation of the road object 311 to at least one of the link 305 or the link 307. For instance, the road object model may use the road object information (e.g. "RAMP" and "40 kmph") and determine whether the location of the road object 311 is closer to the link 307 to associate the road object observation to the link 307.

However, in most of cases, the road object model may fail to accurately associate the road object observation of the road object 311 to at least one of link 305 or the link 307. For instance, the road object model may fail to accurately associate the road object observation of the road object 311 to the link 307, when road object information is not correctly captured, the road object information is occluded by another vehicle, the road object information is not properly displayed, the road object 311 is located on a complex road geometry. For instance, the complex road geometry may include a ramp road geometry comprising the links 305, 307, and 309, as illustrated in FIG. 3A. Alternatively, the complex road geometry may include a merging road geometry comprising merging links, a parallel road geometry comprising parallel links, an intersection road geometry comprising at least three different links, or the like. When the road object model fails to accurately associate the road object observation of the road object 311 to at least one of link 305 or the link 307, the vehicle 301 may end-up with unwanted conditions such as road accidents, increase in travel time, vehicle efficiency reduction, traffic congestions, environmental pollutions, and the like.

To this end, the system 101 is provided to validate an output of the road object model such that the unwanted conditions are avoided. In various embodiments, the system 101 validates the output of the road object model by a path-based approach. Hereinafter, the 'output of the road object model' and 'road object data' may be interchangeably used to mean the same. Further, the system 101 configured for validating the road object data using the path-based approach is explained in detail with various scenarios in the detailed description of FIG. 3B-FIG. 3I.

FIG. 3B illustrates a first working environment 300b of the system 101 for validating the road object data, in accordance with one or more example embodiments. As illustrated in FIG. 3B, the first working environment 300b may include the link 305, the link 307, the link 309, the road object 311, a road object observation 313, a driving direction data 315 of the vehicle 301, a geographic region 317, and ground truth data 319. The road object observation 313 may be the road object observation of the road object 311 made by the vehicle 301 while traveling on the link 305. The driving direction data 315 may correspond to the driving direction 303 of the vehicle 301. According to some embodiments, the driving direction data 315 may be a part of the road object observation 313. For instance, the driving direction data 315 may be included within the road objet observation 313, because the road objet observation 313 and the driving direction data 315 may be collected at same instance of time.

Once the road object observation 313 is made, the road object model may be triggered to process the road object observation 313 for outputting the road object data. For instance, the road object model may process the road object observation 313 as explained in the detailed description of FIG. 3A. Once the road object data is outputted by the road object model, the system 101 may be triggered to receive the road object data. In some embodiments, the system 101 may receive the road object data along with the road object observation 313. In this case, the road object observation 313 may be included within the road object data.

Upon receiving the road object data, the system 101 may identify the road object observation 313 associated with the road object data. The road object observation 313 may include location data (e.g. a location of the vehicle 301 where the road object 311 was observed) and the driving direction data 315. Additionally, the road object observation 313 may include the road object information, a timestamp, and the like. The system 101 may map-match the road object observation 313 with the map data stored in the map database 103a to determine the geographic region 317. For instance, the system 101 may determine a map tile (defining the geographic region 317) by map-matching the location data included in the road object observation 313 with the map data. In FIG. 3B, the map tile of circular shape defining the geographic region 317 is considered for exemplary purpose. In other embodiments, the map tile may be any polygonal shape, when the map data is two-dimensional data. In yet other embodiments, the map tile may be of spherical shape, cuboidal shape, or the like, when the map data is three-dimensional data. The geographic region 317 may include a plurality of links (e.g. links 305, 307, and 309), at least one road object (e.g. the road object 311), and the like. According to some embodiments, the plurality of links in the geographic region 317 may correspond to the complex road geometry. For instance, the complex road geometry may include a ramp road geometry comprising the links 305, 307, and 309, as illustrated in FIG. 3A. Alternatively, the complex road geometry may include a merging road geometry comprising merging links, a parallel road geometry comprising parallel links, an intersection road geometry comprising at least three different links, or the like. Accordingly, the geographic region 317 may include at least one of a ramp road geometry, a parallel road geometry, a merging road geometry, an intersection road geometry and the like.

In some other embodiments, the road object model may determine the geographic region 317, while processing the road observation 313 to output the road object data. For instance, the road object model may determine the map tile (defining the geographic region 317), while processing the road object observation 313. In other words, the road object model may determine, using the road object observation 313, the geographic region 317 and process, using the geographic region 317, the road object observation 313 to output the road object data. In this case, the road object model may output the road object data along the road object observation 313 and data (e.g. map tile identity (ID)) about the geographic region 317. As a result, the system 101 may be configured to receive, from the road object model, the road object data for the geographic region 317.

In various embodiments, the system 101 may be configured to identify, from the map database 103a, the ground truth data 319 associated with the geographic region 317. For instance, the system 101 may identify the ground truth data 319 associated with the map tile (defining the geographic region 317). According to some embodiments, the ground truth data 319 may be collected by the ground truth vehicles. In various embodiments, the ground truth data 319 may comprise the ground truth driving direction data, the ground truth route data, and the ground truth information. The ground truth route data may comprise data about a path travelled by the ground truth vehicle. For instance, the ground truth route data may comprise data about links (e.g. the links 305 and 309) in the geographic region 319 on which the ground truth vehicle has travelled. The ground truth driving direction data may comprise data about a direction in which the ground truth vehicle has travelled on the path defined by the ground truth route data. The ground truth information may comprise the ground truth location data and the data about at least one road object posted on the path defined by the ground truth route data, when the at least one road object is applicable to the path defined by the ground truth route data.

In various embodiments, the system 101 may be configured to determine a state of the ground truth data 319 associated with the geographic region 317. When the ground truth data for each link (e.g. the links 305, 307, and 309) in the geographic region 317 is present, the system 101 may determine the state of the ground truth data 319 as complete ground truth data. When the ground truth data for at least one link in the geographic region 317 is present, the system 101 may determine the state of the ground truth data 319 as partial ground truth data. In FIG. 3B, the ground truth data 319 is present for the links 305 and 309. Accordingly, the system 101 may determine the state of the ground truth data 319 as the partial ground truth data. Hereinafter, the ground truth data 319 may be referred to as the partial ground truth data. The partial ground truth data may comprise the ground truth driving direction data on the links 305 and 309, the ground truth route data on the links 305 and 309, and ground truth information (hereinafter, partial ground truth information) on the links 305 and 309.

In various embodiments, the system 101 may be configured to validate the road object data, based on the determined state of the ground truth data 319. For instance, the validation module 201c of the system 101 may validate the road object data, based on the determined state of the ground truth data 319. According to some embodiments, when the state of the ground truth data 319 is determined as the partial ground truth data, the system 101 may perform a first validation operation for validating the road object data. When the state of the ground truth data 319 is determined as the complete ground truth data, the system 101 may perform a second validation operation for validating the road object data.

Since, with reference to FIG. 3B, the state of the ground truth data 319 is determined as the partial ground truth data, the system 101 may perform the first validation operation for validating the road object data. For performing the first validation operation, the system 101 may identify the road object observation 313 associated with the road object 311. In some embodiments, the system 101 may identify the road object observation 313 from the road object data. Further, the system 101 may identify the driving direction data 315 from the road object observation 313. For instance, the system 101 may extract the driving direction data 315 associated with the road object observation 313. Furthermore, the system 101 may identify, from the partial ground truth data, the ground truth driving direction data. For instance, the system 101 may extract the ground truth driving direction data on the links 305 and 309 in the partial ground truth data.

The system 101 may determine whether the driving direction data 315 is overlapping with the ground truth driving direction data. For instance, the system 101 may determine whether the driving direction data 315 and the ground truth driving direction data are similar at the location where the driving direction data 315 was collected. If the driving direction data 315 is not overlapping with the ground truth driving direction data, the system 101 may stop validating the road object data. For instance, non-overlapping condition of the driving direction data 315 and the ground truth driving direction data may indicate the ground truth data is not present at the location where the driving direction data 315 was collected, and as a result the system 101 may stop the first validation operation. Further, in some example embodiments, the system 101 may generate a notification to complete the ground truth data collection, if the driving direction data 315 is not overlapping with the ground truth driving direction data.

If the driving direction data 315 is overlapping with the ground truth driving direction data, the system 101 may identify the location data associated with the road object observation 313. For instance, the system 101 may extract the location data in the road object observation 313. The system 101 may identify, from the partial ground truth data, the ground truth route data. For instance, the system 101 may extract the ground truth route data on the links 305 and 309 in the partial ground truth data. Further, the system 101 may validate the road object data based on the ground truth route data and the location data.

For validating the road object data based on the ground truth route data and the location data, the system 101 may determine whether the location data is located on the path defined by the ground truth route data. For instance, the system 101 may determine whether the location at where the road object observation 313 was collected is located on a link (e.g. the link 305) on which the ground truth vehicle has travelled. If the location data is not located on the path defined by the ground truth route data, the system 101 may stop validating the road object data. For instance, the location data not located on the path defined by the ground truth route data may indicate the ground truth data is not present at the location where the road object observation 313 was collected, and as a result the system 101 may stop validating the road object data. Further, in some example embodiments, the system 101 may generate a notification to complete the ground truth data collection, if the location data is not located on the path defined by the ground truth route data.

If the location data is located on the path defined by the ground truth route data, the system 101 may identify the partial ground truth information from the partial ground truth data. For instance, the system 101 may extract the partial ground truth information in the ground truth data 319. For instance, with reference to FIG. 3B, the partial ground truth information may indicate the links 305 and 309 are not associated with any road object, because the road object 311 is associated to the link 307. In other words, the partial ground truth information may not comprise any ground truth location data.

Further, the system 101 may compare the partial ground truth information with the location data associated with the road object observation 313. For instance, the system 101 may check if the location data is similar to the ground truth location data included in the partial ground truth information. Furthermore, the system 101 may validate the road object data based on the comparison between the partial ground truth information with the location data. For instance, with reference to FIG. 3B, the comparison between the partial ground truth information (i.e. the ground truth location data) and the location data associated with the road object observation 313 may indicate that the location data is not similar to the ground truth location data, because the partial ground truth information does not comprise any ground truth location data. For validating the road object data based on the comparison, the system 101 may determine a first link (also referred to as map-matched link) from the geographic region 317. As used herein, the first link may be the link (e.g. the link 305) on which the vehicle 301 is traveling. In some embodiments, the system 101 may determine the link 305 as the first link by map-matching the location data associated with the road object observation 313 to the map data. Further, the system 101 may determine, from the road object data, an association between the first link and the road object 311. In various embodiments, the association between the first link and the road object 311 may correspond to the output of the road object model. For instance, the association between the first link and the road object 311 may indicate at least one of the road object 311 is placed on the first link or the road object 311 is not placed on the first link. In other words, the association between the first link and the road object 311 may indicate at least one of associating the road object observation 313 of the road object 311 to the first link or removing the road object observation 313 of the road object 311 on the first link.

The system 101 may validate the road object data as correct road object data when: the association between the first link and the road object 311 indicates the road object is not placed on the first link; and the comparison between the ground truth location data with the location data indicates that the ground truth location data is not similar to the location data. Alternatively, when: the comparison between the ground truth location data with the location data indicates that the ground truth location data is not similar to the location data; and the association between the first link and the road object 311 indicates the road object is placed on the first link, the system 101 may validate the road object data as incorrect road object data. The correct road object data may be indicative of reliable road object data. The incorrect road object may be indicative of non-reliable road object data.

Further, in some embodiments, the system 101 may classify the road object model as a correct road object model, when the road object data is validated as the correct road object data. The system 101 may classify the road object model as an incorrect road object model, when the road object data is validated as the incorrect road object data.

According to some embodiments, the road object model may also output a second association between the road object 311 and at least one second link in the geographic region 317. As used herein, the at least one second link may correspond to other links (e.g. link 307 and the link 309) in the geographic region 317 that are connected to the first link. The second association between the road object 311 and a second link (e.g., the link 307) may indicate at least one of the road object 311 is placed on the second link or the road object 311 is not placed on the second link. In other words, the second association between the second link (e.g. the link 307) and the road object 311 may indicate at least one of associating the road object observation 313 of the road object 311 to the second link or not-associating the road object observation 313 of the road object 311 to the second link.

To this end, in some embodiments, the system 101 may be configured to identify at least one second link (i.e. the other links) in the geographic region 317, while validating the road object data. Further, the system 101 may identify, from the road object data, the second association between the at least one second link and the road object 311. Furthermore, the system 101 may be configured to exclude, from the first validation operation, at least one of the at least one second link and the second association between the at least one second link and the road object 311, when the at least one second link is not associated with the path defined by the ground truth route data. In other words, the system 101 may exclude, from the first validation operation, validating or checking the second association between the at least one second link and the road object 311, when the ground truth data 319 for the at least one second link is not present. For instance, the system 101 may exclude the second association between the second link (e.g., the link 307) and the road object 311, because the ground truth data 319 for the link 307 is not present. Accordingly, in these embodiments, the system 101 avoids validating the second association between the second link (e.g. the link 307) and the road object 311, as the ground truth data 319 for the link 307 is not present. Therefore, the exclusion of the second association between the second link (e.g. the link 307) and the road object 311 avoids false positives and/or true negatives that are caused due to the partial ground truth data and allows the system 101 to accurately validate the road object data. This also leads to saving of time and efficiency improvement for road object data validation procedure, because a lot of time that would have been spent on checking road object data for links which are actually not on the ground truth route, can be saved.

In this way, the system 101 may validate the road object data to determine whether the road object model accurately removes the road object observation 313 on the first link (e.g. the link 305) such that unwanted conditions are avoided. Furthermore, in some example embodiments, the system 101 may generate, using the correct road object data, accurate navigation instructions to provide one or more navigation functions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

For purpose of explanation, in FIG. 3B, the ground truth data 319 collected on the links 305 and 309 is considered. In some other cases, ground truth data may be collected on the links 305 and 307. When the ground truth data is collected on the links 305 and 307, the system 101 may validate the road object data as explained in the detailed description of FIG. 3C.

FIG. 3C illustrates a second working environment 300c of the system 101 for validating the road object data, in accordance with one or more example embodiments. The second working environment 300c may include the link 305, the link 307, the link 309, the road object 311, the road object observation 313, the driving direction data 315, the geographic region 317, and ground truth data 321 collected on the links 305 and 307. According to some embodiments, the system 101 may be configured to receive, from the road object model, the road object data for the geographic region 317. In various embodiments, the system 101 may be configured to determine, from the map database 103a, the ground truth data 321 associated with the geographic region 317. The ground truth data 321 may be collected by the ground truth vehicles. In various embodiments, the ground truth data 321 may comprise the ground truth driving direction data, the ground truth route data, and the ground truth information. In various embodiments, the system 101 may be configured to determine the state of the ground truth data 321 associated with the geographic region 317. Since the ground truth data 321 is collected only on the links 305 and 307, the system 101 may determine the state of the ground truth data 321 as the partial ground truth data.

In various embodiments, the system 101 may be configured to validate the road object data, based on the determined state of the ground truth data 321. When the state of the ground truth data 321 is determined as the partial ground truth data, the system 101 may perform the first validation operation for validating the road object data. When the state of the ground truth data 321 is determined as the complete ground truth data, the system 101 may perform the second validation operation for validating the road object data. Since, with reference to FIG. 3C, the state of the ground truth data 321 is determined as the partial ground truth data, the system 101 may perform the first validation operation for validating the road object data. For performing the first validation operation, the system 101 identify the road object observation 313 associated with the road object 311. Further, the system 101 may identify the driving direction data 315 from the road object observation 313. Furthermore, the system 101 may identify, from the partial ground truth data, the ground truth driving direction data. For instance, the system 101 may extract the ground truth driving direction data on the links 305 and 307 in the ground truth data 321.

The system 101 may determine whether the driving direction data 315 is overlapping with the ground truth driving direction data. For instance, the system 101 may determine whether the driving direction data 315 and the ground truth driving direction data are similar at the location where the driving direction data 315 was collected. If the driving direction data 315 is overlapping with the ground truth driving direction data, the system 101 may identify the location data from the road object observation 313. The system 101 may identify, from the partial ground truth data (e.g. the ground truth data 321), the ground truth route data. For instance, the system 101 may extract the ground truth route data on the links 305 and 307 in the ground truth data 321. Further, the system 101 may validate the road object data based on the ground truth route data and the location data.

For validating the road object data based on the ground truth route data and the location data, the system 101 may determine whether the location data is located on the path defined by the ground truth route data. For instance, the system 101 may determine whether the location at where the road object observation 313 was collected is located on a link (e.g. the link 305) on which the ground truth vehicle has travelled. If the location data is located on the path defined by the ground truth route data, the system 101 may identify the ground truth information from the partial ground truth data (i.e. the ground truth data 321). For instance, with reference to FIG. 3B, the ground truth information (also referred to as the partial ground truth information) may comprise the ground truth location data (e.g. the location of the ground truth vehicle where the road object 311 was observed), road object information (e.g. data indicating "RAMP" and "40 kmph" speed limit value), a first message indicating the road object 311 is not associated with the link 305, and a second message indicating the road object 311 is associated with the link 307.

Further, the system 101 may compare the partial ground truth information with the location data associated with the road object observation 313. For instance, the system 101 may check if the location data is similar to the ground truth location data included in the partial ground truth information. For example, the comparison between the partial ground truth information (i.e. the ground truth location data) and the location data associated with the road object observation 313 may indicate that the location data is similar to the ground truth location data, when the ground truth location data and the location data is within a threshold distance. The threshold distance may be determined by experimentation and the like. Furthermore, the system 101 may validate the road object data based on the comparison between the partial ground truth information with the location data. For validating the road object data based on the comparison, the system 101 may determine the first link from the geographic region 317. In some embodiments, the system 101 may determine the link 305 as the first link by map-matching the location data to the map data. Further, the system 101 may determine, from the road object data, the association between the first link and the road object 311. For instance, the association between the first link and the road object 311 may indicate at least one of the road object 311 is placed on the first link or the road object 311 is not placed on the first link.

Furthermore, the system 101 may identify the at least one second link from the geographic region 317. For instance, the system 101 may identify the link 307 as the second link. The system 101 may identify, from the road object data, the second association between the second link (e.g. the link 307) and the road object 311. For instance, the second association may indicate at least one of the road object 311 is placed on the second link or the road object 311 is not placed on the second link. In other words, the second association between the second link and the road object 311 may indicate at least one of associating the road object observation 313 of the road object 311 to the second link or not-associating the road object observation 313 of the road object 311 to the second link.

Furthermore, the system 101 may validate the road object data as the correct road object data, when: the association between the first link and the road object indicates that the road object is not placed on the first link; the second association between the road object and the second link indicates that the road object is placed on the second link; the comparison between the ground truth location data and the location data indicates the ground truth location data is similar to the location data; and the second message indicates the road object 311 is associated with the second link. Furthermore, in some embodiments, the system 101 may classify the road object model as the correct road object model, when the road object data is validated as the correct road object data.

In this way, the system 101 may validate the road object data to determine whether the road object model accurately removes the road object observation on the first link and associates the road object observation to the second link (e.g. the link 307) such that unwanted conditions are avoided. Further, the system 101 may generate, using the correct road object data, navigation instructions to provide the one or more navigation functions.

Here for purpose of explanation, in FIG. 3C, the ground truth data 321 collected on the links 305 and 307 is considered. For instance, ground truth data may be collected on all links 305, 307, and 309 in the geographic region 317. When the ground truth data is collected on all links 305, 307, and 309 in the geographic region 317, the system 101 may validate the road object data as explained in the detailed description of FIG. 3D.

FIG. 3D illustrates a third working environment 300d of the system 101 for validating the road object data, in accordance with one or more example embodiments. The third working environment 300d may include the link 305, the link 307, the link 309, the road object 311, the road object observation 313, the driving direction data 315, the geographic region 317, and ground truth data 323 collected on the links 305, 307, and 309.

According to some embodiments, the system 101 may be configured to receive, from the road object model, the road object data for the geographic region 317. In various embodiments, the system 101 may be configured to determine, from the map database 103a, the ground truth data 323 associated with the geographic region 317. The ground truth data 323 may be collected by the ground truth vehicles. In various embodiments, the ground truth data 323 may comprise the ground truth driving direction data, the ground truth route data, and the ground truth information. In various embodiments, the system 101 may be configured to determine the state of the ground truth data 323 associated with the geographic region 317. Since the ground truth data 323 is collected on all the links 305, 307 and 309 in the geographic region 317, the system 101 may determine the state of the ground truth data 323 as the complete ground truth data.

In various embodiments, the system 101 may be configured to validate the road object data, based on the determined state of the ground truth data 323. When the state of the ground truth data 323 is determined as the partial ground truth data, the system 101 may perform the first validation operation for validating the road object data. When the state of the ground truth data 323 is determined as the complete ground truth data, the system 101 may perform the second validation operation for validating the road object data. Since, with reference to FIG. 3D, the state of the ground truth data 323 is determined as the complete ground truth data, the system may perform the second validation operation. For performing the second validation operation, the system 101 may identify, from the complete ground truth data (e.g. the ground truth data 323), the ground truth information (hereinafter, complete ground truth information). For instance, with reference to FIG. 3D, the complete ground information may comprise the ground truth location data (e.g. the location of the ground truth vehicle where the road object 311 was observed), road object information (e.g. data indicating "RAMP" and "40 kmph" speed limit value), a first message indicating the road object 311 is not associated with the link 305, a second message indicating the road object 311 is associated with the link 307, and a third message indicating the road object 311 is not associated with the link 309.

Further, the system 101 may compare the road object data with the complete ground truth information. For instance, the system 101 may determine whether the road object data and the complete ground truth information are similar. For instance, the road object data may include at least one of associating the road object observation of the road object 311 to link 305; removing the road object observation of the road object 311 on link 305; associating the road object observation of the road object 311 to link 307; not-associating the road object observation of the road object 311 on link 307; associating the road object observation of the road object 311 to link 309; and not-associating the road object observation of the road object 311 on link 309. For example, to determine whether the road object data and the complete ground truth information are similar, the system 101 may check whether the road object data corresponds to removing the road object observation of the road object 311 on link 305; associating the road object observation of the road object 311 to link 307; and not-associating the road object observation of the road object 311 on link 309.

If the road object data and the complete ground truth information are similar, then the system 101 may determine the road object data as the correct road object data. If the road object data and the complete ground truth information are not similar, then the system 101 may determine the road object data as the incorrect road object data. Further, in some embodiments, the system 101 may classify the road object model as the correct road object model, when the road object data is validated as the correct road object data. The system 101 may classify the road object model as the incorrect road object model, when the road object data is validated as the incorrect road object data.

In this way, the system 101 may validate the road object data to determine whether the road object model accurately removes the road object observation on the first link (e.g. the link 305); associates the road object observation 313 to the link 307; and not-associates the road object observation to the link 309 such that unwanted conditions are avoided. Further, the system 101 may generate, using the correct road object data, navigation instructions to provide the one or more navigation functions.

For purpose of explanation, in FIGS. 3A-3D, the vehicle 301 traveling in the geographic region 317 comprising the ramp road geometry is considered. In other cases, the vehicle 301 may also travel in a geographic region comprising an intersection road geometry. When the vehicle 301 is traveling in the geographic region comprising an intersection road geometry, the system 101 may validate the road object data as explained in the detailed description of FIG. 3E.

FIG. 3E illustrates a fourth working environment 300e of the system 101 for validating the road object data, in accordance with one or more example embodiments. The fourth working environment 300e may include a geographic region 325, a link 327, a link 329, a link 331, a link 333, a road object 335 posted on both sides of the link 333, a road object observation 337, a driving direction data 339, and ground truth data 341 collected on the links 327 and 331. According to some embodiments, the system 101 may be configured to receive, from the road object model, the road object data for the geographic region 325. The geographic region 325 may include an intersection road geometry comprising the links 327, 329, 331, and 333, as illustrated in FIG. 3E.

In various embodiments, the system 101 may be configured to determine, from the map database 103a, the ground truth data 341 associated with the geographic region 325. The ground truth data 341 may be collected on links 327 and 331, by the ground truth vehicles. In various embodiments, the ground truth data 341 may comprise the ground truth driving direction data, the ground truth route data, and the ground truth information. In various embodiments, the system 101 may be configured to determine the state of the ground truth data 341 associated with the geographic region 325. Since the ground truth data 341 is collected only on the links 327 and 331, the system 101 may determine the state of the ground truth data 341 as the partial ground truth data.

In various embodiments, the system 101 may be configured to validate the road object data, based on the determined state of the ground truth data 341. When the state of the ground truth data 341 is determined as the partial ground truth data, the system 101 may perform the first validation operation for validating the road object data. When the state of the ground truth data 341 is determined as the complete ground truth data, the system 101 may perform the second validation operation for validating the road object data. Since, with reference to FIG. 3E, the state of the ground truth data 341 is determined as the partial ground truth data, the system 101 may perform the first validation operation for validating the road object data. For performing the first validation operation, the system 101 identify the road object observation 337 associated with the at least one road object 335. Further, the system 101 may identify the driving direction data 339 from the road object observation 337. Furthermore, the system 101 may identify, from the partial ground truth data (e.g. the ground truth data 341), the ground truth driving direction data.

The system 101 may determine whether the driving direction data 339 is overlapping with the ground truth driving direction data. For instance, the system 101 may determine whether the driving direction data 339 and the ground truth driving direction data are similar at the location where the road object observation 337 was collected. If the driving direction data 339 is overlapping with the ground truth driving direction data, the system 101 may identify the location data from the road object observation 337. The system 101 may identify, from the partial ground truth data (e.g. the ground truth data 341), the ground truth route data. Further, the system 101 may validate the road object data based on the ground truth route data and the location data.

For validating the road object data based on the ground truth route data and the location data, the system 101 may determine whether the location data is located on the path defined by the ground truth route data. For instance, the system 101 may determine whether the location at where the road object observation 337 was collected is located on a link (e.g. the link 327) on which the ground truth vehicle has travelled. If the location data is located on the path defined by the ground truth route data, the system 101 may identify the ground truth information from the partial ground truth data. For instance, with reference to FIG. 3E, the ground truth information (hereinafter, the partial ground truth information) may indicate the links 327 and 331 are not associated with any road object, because the road object 335 is associated with the link 333.

Further, the system 101 may compare the partial ground truth information with the location data associated with the road object observation 327. Furthermore, the system 101 may validate the road object data based on the comparison between the partial ground truth information with the location data. For instance, with reference to FIG. 3E, the comparison between the partial ground truth information (i.e. the ground truth location data) and the location data associated with the road object observation 327 may indicate that the location data is not similar to the ground truth location data, because the partial ground truth information does not comprise any ground truth location data. For validating the road object data based on the comparison, the system 101 may determine the first link from the geographic region 325. In some embodiments, the system 101 may determine the link 327 as the first link by map-matching the location data associated with the road object observation 337 to the map data. Further, the system 101 may determine, from the road object data, an association between the first link and the road object 335. For instance, the association between the first link and the road object 335 may indicate at least one of the road object 335 is placed on the first link or the road object 335 is not placed on the first link.

The system 101 may validate the road object data as correct road object data when: the association between the first link and the road object 335 indicates the road object is not placed on the first link; and the comparison between the ground truth location data with the location data indicates that the ground truth location data is not similar to the location data. Alternatively, when: the comparison between the ground truth location data with the location data indicates that the ground truth location data is not similar to the location data; and the association between the first link and the road object 335 indicates the road object is placed on the first link, the system 101 may validate the road object data as incorrect road object data.

According to some embodiments, the road object model may also output a second association between the road object 335 and at least one second link in the geographic region 325. The at least one second link may correspond to links 329, 331, and 333 in the geographic region 325 that are connected to the first link.

To this end, in some embodiments, the system 101 may be configured to identify at least one second link in the geographic region 325, while validating the road object data. Further, the system 101 identify, from the road object data, the second association between the at least one second link and the road object 335. Further, the system 101 may be configured to exclude, from the first validation process, checking of at least one of the at least one second link and the second association between the at least one second link and the road object 335, when the partial ground truth data (e.g. the partial ground truth information) for the at least one second link is not present. For instance, the system 101 may exclude the second association between the link 333 and the road object 335, because the partial ground truth data for the link 333 is not present. Similarly, the system 101 may exclude the second association between the link 329 and the road object 335, because the partial ground truth data for the link 329 is not present. Accordingly, in these embodiments, the system 101 avoids validating the second association between the links 329 and 333 and the road object 335, as the partial ground truth data for the links 329 and 333 is not present.

In this way, the system 101 may validate the road object data to determine whether the road object model accurately removes the road object observation 337 on the first link (e.g. the link 327) such that unwanted conditions are avoided. Further, the system 101 may generate, using the correct road object data, navigation instructions to provide the one or more navigation functions.

For purpose of explanation, in FIG. 3E, the ground truth data 341 collected on the links 327 and 331 is considered. In some other cases, ground truth data may be collected on all links 327, 329, 331, and 333 in the geographic region 325. When the ground truth data is collected for all links 327, 329, 331, and 333 in the geographic region 325, the system 101 may validate the road object data as explained in the detailed description of FIG. 3F.

FIG. 3F illustrates a fifth working environment 300f of the system 101 for validating the road object data, in accordance with one or more example embodiments. The fifth working environment 300f may include the geographic region 325, the link 327, the link 329, the link 331, the link 333, the road object 335 posted on both sides of the link 333, the road object observation 337, the driving direction data 339, and ground truth data 343 collected on the links 327, 329, 331, and 333.

According to some embodiments, the system 101 may be configured to receive, from the road object model, the road object data for the geographic region 325. In various embodiments, the system 101 may be configured to determine, from the map database 103a, the ground truth data 343 associated with the geographic region 325. The ground truth data 343 may be collected by the ground truth vehicles. In various embodiments, the ground truth data 343 may comprise the ground truth driving direction data, the ground truth route data, and the ground truth information. In various embodiments, the system 101 may be configured to determine the state of the ground truth data 343 associated with the geographic region 325. Since the ground truth data 343 is collected on all the links 327, 329, 331, and 333 in the geographic region 325, the system 101 may determine the state of the ground truth data 343 as the complete ground truth data.

In various embodiments, the system 101 may be configured to validate the road object data, based on the determined state of the ground truth data 343. When the state of the ground truth data 343 is determined as the partial ground truth data, the system 101 may perform the first validation operation for validating the road object data. When the state of the ground truth data 343 is determined as the complete ground truth data, the system 101 may perform the second validation operation for validating the road object data. Since, with reference to FIG. 3F, the state of the ground truth data 343 is determined as the complete ground truth data, the system 101 may perform the second validation operation. For performing the second validation operation, the system 101 may identify, from the complete ground truth data (e.g. the ground truth data 343), the ground truth information (hereinafter, complete ground truth information). For instance, with reference to FIG. 3F, the complete ground information may indicate that the at least one road object 335 is associated with the link 333.

Further, the system 101 may compare the road object data with the complete ground truth information. For instance, the system 101 may determine whether the road object data and the complete ground truth information are similar. For instance, the road object data may include at least one of associating the road object observation 337 to the link 327; removing the road object observation 337 on the link 327; associating the road object observation 337 to the other links (e.g. the links 329, 331, and 333) in the geographic region 325; and not-associating the road object observation 337 to the other links (e.g. the links 329, 331, and 333) in the geographic region 325. For example, to determine whether the road object data and the complete ground truth information are similar, the system 101 may check whether the road object data corresponds to removing the road object observation 337 on the link 327; associating the road object observation 337 to the link 333; and not-associating the road object observation 337 to links 329 and 331, when the complete ground information indicates that the at least one road object 335 is associated with the link 331.

If the road object data and the complete ground truth information are similar, then the system 101 may determine the road object data as the correct road object data. If the road object data and the complete ground truth information are not similar, then the system 101 may determine the road object data as the incorrect road object data. Further, in some embodiments, the system 101 may classify the road object model as the correct road object model, when the road object data is validated as the correct road object data. The system 101 may classify the road object model as the incorrect road object model, when the road object data is validated as the incorrect road object data.

In this way, the system 101 may validate the road object data to determine whether the road object model accurately removes the road object observation 337 on the link 327; associates the road object observation 337 to the link 333; and not-associates the road object observation 337 to the links 329 and 331 such that the unwanted conditions are avoided. Further, the system 101 may generate, using the valid road object data, navigation instructions to provide the one or more navigation functions.

For the purpose of the explanation, in FIG. 3E-FIG. 3F, the geographic region 325 comprising the intersection road geometry of four links (e.g. the links 327, 329, 331, and 333) is considered. In some other cases, a geographic region may comprise an intersection road geometry of three links. When the geographic region comprises the intersection road geometry of three links, the system 101 may validate the road object data as explained in the detailed description of FIG. 3G.

FIG. 3G illustrates a sixth working environment 300g of the system 101 for validating the road object data, in accordance with one or more example embodiments. The sixth working environment 300g may include the geographic region 345, the link 347, the link 349, the link 351, the road object 353 posted on the link 349, the road object 355 posted on both sides of the link 351, the road object observation 357, the driving direction data 359, and ground truth data 361 collected on the links 347, 349, and 351.

According to some embodiments, the system 101 may be configured to receive, from the road object model, the road object data for the geographic region 345. In various embodiments, the system 101 may be configured to determine, from the map database 103a, the ground truth data 361 associated with the geographic region 345. The ground truth data 361 may be collected by the ground truth vehicles. In various embodiments, the ground truth data 361 may comprise the ground truth driving direction data, the ground truth route data, and the ground truth information. In various embodiments, the system 101 may be configured to determine the state of the ground truth data 361 associated with the geographic region 345. Since the ground truth data 361 is collected on all the links 347, 349, and 351 in the geographic region 345, the system 101 may determine the state of the ground truth data 361 as the complete ground truth data.

In various embodiments, the system 101 may be configured to validate the road object data, based on the determined state of the ground truth data 361. When the state of the ground truth data 361 is determined as the partial ground truth data, the system 101 may perform the first validation operation for validating the road object data. When the state of the ground truth data 361 is determined as the complete ground truth data, the system 101 may perform the second validation operation for validating the road object data. Since, with reference to FIG. 3G, the state of the ground truth data 361 is determined as the complete ground truth data, the system 101 may perform the second validation operation. For performing the second validation operation, the system 101 may identify, from the complete ground truth data, the ground truth information (hereinafter, complete ground truth information). For instance, with reference to FIG. 3G, the complete ground information may indicate that the road object 353 is associated with the link 349 and the at least one road object 355 is associated with the link 351.

Further, the system 101 may compare the road object data with the complete ground truth information. For instance, the system 101 may determine whether the road object data and the complete ground truth information are similar. For instance, the road object data may include at least one of associating the road object observation 357 to the link 347; removing the road object observation 357 on the link 347; associating the road object observation 347 to the other links (e.g. the links 349 and 351) in the geographic region 345; and not-associating the road object observation 357 to the other links in the geographic region 345. The road object observation 357 may be an observation made by the vehicle 301 from at least one of the road object 353 or the at least one road object 355. For example, to determine whether the road object data and the complete ground truth information are similar, the system 101 may check whether the road object data corresponds to removing the road object observation 357 on the link 347 and associating the road object observation 357 to the at least one of the link 349 and 351, when the complete ground information indicates that the road object 353 is associated with the link 349 and the at least one road object 355 is associated with the link 351.

If the road object data and the complete ground truth information are similar, then the system 101 may determine the road object data as the correct road object data. If the road object data and the complete ground truth information are not similar, then the system 101 may determine the road object data as the incorrect road object data. Further, in some embodiments, the system 101 may classify the road object model as the correct road object model, when the road object data is validated as the correct road object data. The system 101 may classify the road object model as the incorrect road object model, when the road object data is validated as the incorrect road object data.

In this way, the system 101 may validate the road object data to determine whether the road object model accurately removes the road object observation 357 on the link 347 and associates the road object observation 357 to at least one of the link 349 and the link 351 such that the unwanted conditions are avoided. In other words, the system 101 may validate the road object data to determine whether the road object model accurately moves the road object observation 357 to downstream links (e.g. the links 349 and 351) for propagating the vehicle 301 in the downstream links. Further, the system 101 may generate, using the valid road object data, navigation instructions to provide the one or more navigation functions.

For the purpose of the explanation, in FIG. 3E-FIG. 3G, the geographic region 345 comprising the intersection road geometry is considered. In some other cases, a geographic region may comprise a parallel road geometry. When the geographic region comprises the parallel road geometry, the system 101 may validate the road object data as explained in the detailed description of FIG. 3H.

FIG. 3H illustrates a seventh working environment 300h of the system 101 for validating the road object data, in accordance with one or more example embodiments. The seventh working environment 300h may include a geographic region 363, a link 365, a link 367, a road object 369 posted on both sides of the link 365, a road object observation 371, a driving direction data 373, and ground truth data 375 collected on the link 365. According to some embodiments, the system 101 may be configured to receive, from the road object model, the road object data for the geographic region 363. The geographic region 363 may include a parallel road geometry comprising the links 365 and 367, as illustrated in FIG. 3H.

In various embodiments, the system 101 may be configured to determine the ground truth data 375 associated with the geographic region 363. The ground truth data 375 may be collected on the link 365, by the ground truth vehicles. In various embodiments, the ground truth data 375 may comprise the ground truth driving direction data, the ground truth route data, and the ground truth information. In various embodiments, the system 101 may be configured to determine the state of the ground truth data 375 associated with the geographic region 363. Since the ground truth data 375 is collected only on the link 365, the system 101 may determine the state of the ground truth data 375 as the partial ground truth data.

In various embodiments, the system 101 may be configured to validate the road object data, based on the determined state of the ground truth data 375. When the state of the ground truth data 375 is determined as the partial ground truth data, the system 101 may perform the first validation operation for validating the road object data. When the state of the ground truth data 375 is determined as the complete ground truth data, the system 101 may perform the second validation operation for validating the road object data. Since, with reference to FIG. 3H, the state of the ground truth data 375 is determined as the partial ground truth data, the system 101 may perform the first validation operation for validating the road object data. For performing the first validation operation, the system 101 identify the road object observation 371 associated with the road object 369. The road object observation 371 may be an observation made by the vehicle 301 for the at least one road object 369.

Further, the system 101 may identify the driving direction data 373 from the road object observation 371. Furthermore, the system 101 may identify, from the partial ground truth data (e.g. the ground truth data 375), the ground truth driving direction data. The system 101 may determine whether the driving direction data 373 is overlapping with the ground truth driving direction data. For instance, the system 101 may determine whether the driving direction data 373 and the ground truth driving direction data are similar at the location where the road object observation 371 was collected. If the driving direction data 373 is overlapping with the ground truth driving direction data, the system 101 may identify, from the road object observation 371, the location data. The system 101 may identify, from the partial ground truth data (e.g. the ground truth data 375), the ground truth route data. Further, the system 101 may validate the road object data based on the ground truth route data and the location data.

For validating the road object data based on the ground truth route data and the location data, the system 101 may determine whether the location data is located on the path defined by the ground truth route data. For instance, the system 101 may determine whether the location at where the road object observation 371 was collected is located on a link (e.g. the link 365) on which the ground truth vehicle has travelled. If the location data is located on the path defined by the ground truth route data, the system 101 may identify the ground truth information from the partial ground truth data. For instance, with reference to FIG. 3H, the ground truth information (hereinafter, the partial ground truth information) may indicate the at least one road object 369 is associated with the link 365. In other words, the ground truth information may comprise the ground truth location data, the road object information (e.g. data indicating "80 kmph" speed limit value), a message indicating the road object 369 is placed on the link 365.

Further, the system 101 may compare the partial ground truth information with the location data associated with the road object observation 371. For instance, the system 101 may check if the location data is similar to the ground truth location data included in the partial ground truth information. For example, the comparison between the partial ground truth information (i.e. the ground truth location data) and the location data associated with the road object observation 313 may indicate that the location data is similar to the ground truth location data, when the ground truth location data and the location data is within the threshold distance. Furthermore, the system 101 may validate the road object data based on the comparison between the partial ground truth information with the location data. For validating the road object data based on the comparison, the system 101 may identify the first link from the geographic region 363. In some embodiments, the system 101 may determine the link 365 as the first link by map-matching the location data associated with the road object observation 371 to the map data. The system 101 may identify, from the road object data, the association between the first link and the road object 369. For instance, the association between the first link and the road object 369 may indicate at least one of the road object 369 is placed on the first link or the road object 369 is not placed on the first link.

The system 101 may validate the road object data as correct road object data when: the association between the first link and the road object 369 indicates the road object 369 is placed on the first link; the comparison between the ground truth location data with the location data indicates that the ground truth location data is similar to the location data; and the ground truth information indicates the road object 369 is placed on the first link. Alternatively, when: the association between the first link and the road object 369 indicates the road object 369 is not placed on the first link; the comparison between the ground truth location data with the location data indicates that the ground truth location data is similar to the location data; and the ground truth information indicates the road object 369 is placed on the first link, the system 101 may validate the road object data as incorrect road object data. Further, in some embodiments, the system 101 may classify the road object model as the correct road object model, when the road object data is validated as the correct road object data. The system 101 may classify the road object model as the incorrect road object model, when the road object data is validated as the incorrect road object data.

In this way, the system 101 may validate the road object data to determine whether the road object model accurately associates the road object observation 337 to the first link (e.g. the link 365) such that unwanted conditions are avoided. Further, the system 101 may generate, using the valid road object data, navigation instructions to provide the one or more navigation functions.

For purpose of explanation, in FIG. 3H, the ground truth data 375 collected on the link 365 is considered. In some other cases, ground truth data may be collected for all links (e.g. the links 365 and 367) in the geographic region 363. When the ground truth data is collected for all links in the geographic region 363, the system 101 may validate the road object data as explained in the detailed description of FIG. 3I.

FIG. 3I illustrates an eighth working environment 300i of the system 101 for validating the road object data, in accordance with one or more example embodiments. The eight working environment 300i may include the geographic region 363, the link 365, the link 367, the road object 369 posted on both sides of the link 365, the road object observation 371, the driving direction data 373, and ground truth data 377 collected on the links 365 and 367.

According to some embodiments, the system 101 may be configured to receive, from the road object model, the road object data for the geographic region 363. In various embodiments, the system 101 may be configured to determine, from the map database 103a, the ground truth data 377 associated with the geographic region 363. The ground truth data 377 may be collected on the links 365 and 367, by the ground truth vehicles. In various embodiments, the ground truth data 377 may comprise the ground truth driving direction data, the ground truth route data, and the ground truth information. In various embodiments, the system 101 may be configured to determine the state of the ground truth data 377 associated with the geographic region 363. Since the ground truth data 377 is collected on all the links in the geographic region 363, the system 101 may determine the state of the ground truth data 377 as the complete ground truth data.

In various embodiments, the system 101 may be configured to validate the road object data, based on the determined state of the ground truth data 377. When the state of the ground truth data 377 is determined as the partial ground truth data, the system 101 may perform the first validation operation for validating the road object data. When the state of the ground truth data 377 is determined as the complete ground truth data, the system 101 may perform the second validation operation for validating the road object data. Since, with reference to FIG. 3I, the state of the ground truth data 377 is determined as the complete ground truth data, the system 101 may perform the second validation operation. For performing the second validation operation, the system 101 may identify, from the complete ground truth data (e.g. the ground truth data 377), the ground truth information (hereinafter, complete ground truth information). For instance, with reference to FIG. 3I, the complete ground information may indicate that the at least one road object 369 is associated with the link 365.

Further, the system 101 may compare the road object data with the complete ground truth information. For instance, the system 101 may determine whether the road object data and the complete ground truth information are similar. For instance, the road object data may include at least one of associating the road object observation 371 to the link 365; removing the road object observation 371 on the link 365; associating the road object observation 371 to the other links (e.g. the link 367) in the geographic region 363; and not-associating the road object observation 371 to the other links in the geographic region 363. For example, to determine whether the road object data and the complete ground truth information are similar, the system 101 may check whether the road object data corresponds to associating the road object observation 371 to the link 365 and not-associating the road object observation 371 to the link 367, when the complete ground information indicates that the at least one road object 369 is associated with the link 365.

If the road object data and the complete ground truth information are similar, then the system 101 may determine the road object data as the correct road object data. If the road object data and the complete ground truth information are not similar, then the system 101 may determine the road object data as the incorrect road object data. Further, in some embodiments, the system 101 may classify the road object model as the correct road object model, when the road object data is validated as the correct road object data. The system 101 may classify the road object model as the incorrect road object model, when the road object data is validated as the incorrect road object data.

In this way, the system 101 may validate the road object data to determine whether the road object model accurately associates the road object observation 371 to the link 365 such that the unwanted conditions are avoided. Further, the system 101 may generate, using the valid road object data, navigation instructions to provide the one or more navigation functions. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

FIG. 4A illustrates a flowchart depicting a method 400a for validating the road object data, in accordance with one or more example embodiments. It will be understood that each block of the flow diagram of the method 400a may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 400a support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

Starting at block 401, the method 400a may include receiving the road object data for the geographic region 317. For instance, the reception module 201a of the system 101 may receive the road object data for the geographic region 317, as explained in the detailed description of FIG. 3B.

At block 403, the method 400a may include determining, from the map database 103a, the state of ground truth data 319 associated with the geographic region 317. For instance, the ground truth data determination module 201b of the system 101 may determine, from the map database 103a, the ground truth data 319 associated with the geographic region 317 and may determine the state of ground truth data 319 associated with the geographic region 317. The state of the ground truth data 319 may comprise at least one of the partial ground truth data or the complete ground truth data.

At block 405, the method 400a may include validating the road object data, based on the determined state of the ground truth data 319. For instance, the validation module 201c of the system 101 may validate the road object data based on the determined state of the ground truth data 319. If the state of the ground truth data 319 is the partial ground truth data, the validation module 201c of the system 101 may perform the first validation operation for validating the road object data as explained in the detailed description of FIG. 3B. If the state of the ground truth data 319 is the complete ground truth data, the validation module 201c of the system 101 may perform the second validation operation for validating the road object data as explained in the detailed description of FIG. 3D.

FIG. 4B illustrates a flowchart depicting a method 400b for validating the road object data based on the first validation operation, in accordance with one or more example embodiments. The method 400b may be used in conjunction with the system 101 described in the detailed description of FIG. 3B. Although various blocks of method 400b are described below and depicted in FIG. 4B, the blocks need not necessarily all be executed, and in some cases may be executed in a different order than the order shown.

Starting at block 407, the method 400b may include identifying the at least one road object observation 313 associated with the road object 311. The road object observation 313 may include the location data, the driving direction data 315, the road object information, the timestamp, and the like.

At block 409, the method 400b may include identifying the driving direction data 315 from the road object observation 313. For instance, the system 101 may extract the driving direction data 315 in the road object observation 313.

At block 411, the method 400b may include identifying, from the partial ground truth data, at least one of the ground truth driving direction data and the ground truth route data. For instance, the system 101 may extract at least one of the ground truth driving direction data and the ground truth route data in the ground truth data 319.

At block 413, the method 400b may include determining whether the driving direction data 315 is overlapping with the ground truth driving direction data. For instance, the system 101 may determining whether the driving direction data 315 is overlapping with the ground truth driving direction data, as explained in the detailed description of FIG. 3B. If the driving direction data 315 is not overlapping with the ground truth driving direction data, the method 400b may execute block 415. At block 415, the method 400b may include terminating the first validation operation. In other words, the system 101 may stop validating the road object data.

If the driving direction data 315 is overlapping with the ground truth driving direction data, the method 400b may execute block 417. At block 417, the method 400b may include identifying the location data associated with the road object observation 313. For instance, the system 101 may extract the location data from the road object observation 313.

At block 419, the method 400b may include determining whether the location data is located on the path defined by the ground truth route data. For instance, the system 101 may determining whether the location data is located on the ground truth route data, as explained in the detailed description of FIG. 3B. If the location data is not located on the path defined by the ground truth route data, the method 400b may execute block 415. At block 415, the method 400b may include terminating the first validation operation.

If the location data is located on the path defined by the ground truth route data, the method 400b may execute block 421. At block 421, the method 400b may include identifying the partial ground truth information from the partial ground truth data. For instance, the system 101 may extract the partial ground truth information in the partial ground truth data.

At block 423, the method 400b may include validating the road object data, based on the partial ground truth information. For instance, to validate the road object data based on the partial ground truth information, the system 101 may compare the ground truth information with the location data associated with the road object observation 313 and may validate the road object data based on the comparison as explained in the detailed description of FIG. 3B.

FIG. 4C illustrates a flowchart depicting a method 400c for validating the road object data based on the second validation operation, in accordance with one or more example embodiments. The method 400c may be used in conjunction with the system 101 described in the detailed description of FIG. 3D. Starting at block 425, the method 400c may include identifying, from the complete ground truth data, the complete ground truth information. For instance, the system 101 may extract the complete ground truth information in the complete ground truth data.

At block 427, the method 400c may include comparing the road object data with the complete ground truth information. For instance, the system 101 may compare the road object data with the complete ground truth information, as explained in the detailed description of FIG. 3D.

At block 429, the method 400c may include validating the road object data as at least one of the correct road object data and the incorrect road object data, based on the comparison. For instance, the system 101 may validate the road object data as at least one of the correct road object data and the incorrect road object data based on the comparison, as explained in the detailed description of FIG. 3D.

On implementing the methods 400a-400c disclosed herein, the system 101 may be configured to validate the road object data to determine whether the road object model accurately removes the road object observation 313 on the link 305 and associates the road object observation 313 to the link 307 such that the unwanted conditions are avoided. Further, in some embodiments, the system 101 may be configured to provide the one or more navigation functions by generating the navigation instructions using the correct road object data. Some non-limiting examples of the navigation functions includes providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A system for validating road object data, the system comprising:
   a memory configured to store computer-executable instructions; and
   at least one processor configured to execute the computer-executable instructions to:
      receive the road object data for a geographic region;
      determine, from a map database, a state of ground truth data associated with the geographic region, wherein the state of the ground truth data comprises at least one of partial ground truth data and complete ground truth data; and
      validate the road object data, based on the determined state of the ground truth data, wherein the validation comprises performing a first validation operation when the state of the ground truth data is the partial ground truth data and performing a second validation operation when the state of the ground truth data is the complete ground truth data, wherein to validate the road object data based on the first validation operation, the at least one processor is further configured to:
         identify at least one road object observation associated with a road object, wherein the road object data comprises the at least one road object observation;
         identify location data associated with the road object observation;
         identify, from the partial ground truth data, at least ground truth route data; and
         validate the road object data based on the ground truth route data and the location data associated with the at least one road object observation, when the location data is located on a path defined by the ground truth route data.

2. The system of claim 1, wherein to validate the road object data based on the first validation operation, the at least one processor is further configured to:
   identify partial ground truth information from the partial ground truth data, in response to determining that the location data is located on the path defined by the ground truth route data, wherein the partial ground truth information comprises ground truth location data;
   compare the ground truth location data with the location data associated with the at least one road object observation; and
   validate the road object data based on the comparison.

3. The system of claim 2, wherein to validate the road object data based on the first validation operation, the at least one processor is further configured to:
   determine a first link from the geographic region, based on the location data associated with the at least one road object observation and map data;
   determine, based on the road object data, an association between the first link and the road object; and
   validate the road object data as correct when:
      the association between the first link and the road object indicates that the road object is placed on the first link, and
      comparison between the ground truth location data with the location data associated with the at least one road object observation indicates that the ground truth location data is similar to the location data.

4. The system of claim 3, wherein to validate the road object data based on the first validation operation, the at least one processor is further configured to:
   validate the road object data as correct when:
      the association between the first link and the road object indicates that the road object is not placed on the first link, and
      comparison between the ground truth location data with the location data associated with the at least one road object observation indicates that the ground truth location data is not similar to the location data.

5. The system of claim 4, wherein to validate the road object data based on the first validation operation, the at least one processor is further configured to:
   identify at least one second link from the geographic region, wherein the at least one second link is connected to the first link;
   identify, from the road object data, a second association between the at least one second link and the road object; and
   validate the road object data as correct when:
      the association between the first link and the road object indicates that the road object is not placed on the first link and the second association between the road object and the second link indicates that the road object is placed on the second link, and
      comparison between the ground truth location data and the location data associated with the at least one road object observation indicates that the ground truth location data is similar to the location data.

6. The system of claim 5, wherein to validate the road object data based on the first validation operation, the at least one processor is further configured to: exclude, from the first validation operation, checking of at least one of the at least one second link and the second association between the at least one second link and the road object, when the at least one second link is not associated with the path defined by the ground truth route data.

7. The system of claim 1, wherein to validate the road object data based on the first validation operation, the at least one processor is further configured to:
   identify driving direction data associated with a road object observation;
   identify, from the partial ground truth data, ground truth driving direction data;

determine whether the driving direction data is overlapping with the ground truth driving direction data; and
validate the road object data in response to determining that the driving direction data is overlapping with the ground truth driving direction data.

8. The system of claim 1, wherein to validate the road object data based on the second validation operation, the at least one processor is further configured to:
identify, from the complete ground truth data, complete ground truth information;
compare the road object data with the complete ground truth information; and
validate the road object data as at least one of correct road object data and incorrect road object data, based on the comparison.

9. The system of claim 1, wherein to determine the state of the ground truth data associated with the geographic region, the at least one processor is further configured to:
determine the geographic region, based on map data;
identify the ground truth data associated with the geographic region; and
extract the state of the ground truth data associated with the geographic region as at least one of the partial ground truth data and the complete ground truth data.

10. The system of claim 1, wherein the geographic region comprises at least one of a ramp road geometry, a parallel road geometry, a merging road geometry, and an intersection road geometry,
wherein the partial ground truth data comprises ground truth data for at least one link in the at least one of the ramp road geometry, the parallel road geometry, the merging road geometry, and the intersection road geometry, and
wherein the complete ground truth data comprises ground truth data for each link in the at least one of the ramp road geometry, the parallel road geometry, the merging road geometry, and the intersection road geometry.

11. A method for validating road object data, the method comprising:
receiving the road object data for a geographic region;
determining, from a map database, a state of ground truth data associated with the geographic region, wherein the state of the ground truth data comprises at least one of partial ground truth data and complete ground truth data; and
validating the road object data, based on the determined state of the ground truth data, wherein the validation comprises performing a first validation operation when the state of the ground truth data is the partial ground truth data and performing a second validation operation when the state of the ground truth data is the complete ground truth data, wherein validating the road object data based on the first validation operation comprises:
identifying at least one road object observation associated with a road object, wherein the road object data comprises the at least one road object observation;
identifying location data associated with the road object observation;
identifying, from the partial ground truth data, at least ground truth route data; and
validating the road object data based on the ground truth route data and the location data associated with the at least one road object observation, when the location data is located on a path defined by the ground truth route data.

12. The method of claim 11, wherein validating the road object data based on the first validation operation further comprises:
identifying partial ground truth information from the partial ground truth data, in response to determining that the location data is located on the path defined by the ground truth route data, wherein the partial ground truth information comprises ground truth location data;
comparing the ground truth location data with the location data associated with the at least one road object observation; and
validating the road object data based on the comparison.

13. The method of claim 12, wherein validating the road object data based on the first validation operation further comprises:
determining a first link from the geographic region based on the location data associated with the at least one road object observation and map data;
determining, based on the road object data, an association between the first link and the road object; and
validating the road object data as correct when:
the association between the first link and the road object indicates that the road object is placed on the first link, and
comparison between the ground truth location data with the location data associated with the at least one road object observation indicates that the ground truth location data is similar to the location data.

14. The method of claim 13, wherein validating the road object data based on the first validation operation further comprises:
validating the road object data as correct when:
the association between the first link and the road object indicates that the road object is not placed on the first link, and
comparison between the ground truth location data with the location data associated with the at least one road object observation indicates that the ground truth location data is not similar to the location data.

15. The method of claim 14, wherein validating the road object data based on the first validation operation further comprises:
identifying at least one second link from the geographic region, wherein the at least one second link is connected to the first link;
identifying, from the road object data, a second association between the at least one second link and the road object; and
validating the road object data as correct when:
the association between the first link and the road object indicates that the road object is not placed on the first link and the second association between the road object and the second link indicates that the road object is placed on the second link, and
comparison between the ground truth location data and the location data associated with the at least one road object observation indicates that the ground truth location data is similar to the location data.

16. The method of claim 15, wherein validating the road object data based on the first validation operation further comprises excluding, from the first validation operation, checking of at least one of the at least one second link and the second association between the at least one second link and the road object, when the at least one second link is not associated with the path defined by the ground truth route data.

17. The method of claim 11, wherein validating the road object data based on the second validation operation comprises:
 identifying, from the complete ground truth data, complete ground truth information;
 comparing the road object data with the complete ground truth information; and
 validating the road object data as at least one of valid road object data and invalid road object data, based on the comparison.

18. A computer program product comprising a non-transitory computer readable medium having stored thereon computer executable instruction which when executed by at least one processor, cause the processor to carry out operations for validating road object data, the operations comprising:
 receiving the road object data for a geographic region;
 determining, from a map database, a state of ground truth data associated with the geographic region, wherein the state of the ground truth data comprises at least one of partial ground truth data and complete ground truth data; and
 validating the road object data, based on the determined state of ground truth data, wherein the validation comprises performing a first validation operation when the state of the ground truth data is the partial ground truth data and performing a second validation operation when the state of the ground truth data is the complete ground truth data, wherein validating the road object data based on the first validation operation comprises:
 identifying at least one road object observation associated with a road object, wherein the road object data comprises the at least one road object observation;
 identifying location data associated with the road object observation;
 identifying, from the partial ground truth data, at least ground truth route data; and
 validating the road object data based on the ground truth route data and the location data associated with the at least one road object observation, when the location data is located on a path defined by the ground truth route data.

* * * * *